(12) United States Patent
Yamashita

(10) Patent No.: US 10,242,166 B2
(45) Date of Patent: Mar. 26, 2019

(54) IMAGE CAPTURING CONTROL METHOD, IMAGE CAPTURING CONTROL SYSTEM, AND IMAGE CAPTURING CONTROL SERVER

(71) Applicant: Panasonic Intellectual Property Corporation of America, Torrance, CA (US)

(72) Inventor: Kazuhiko Yamashita, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 76 days.

(21) Appl. No.: 15/698,008

(22) Filed: Sep. 7, 2017

(65) Prior Publication Data

US 2018/0089402 A1 Mar. 29, 2018

(30) Foreign Application Priority Data

Sep. 26, 2016 (JP) .................................. 2016-187040

(51) Int. Cl.
*G06F 21/30* (2013.01)
*G06F 21/31* (2013.01)
(Continued)

(52) U.S. Cl.
CPC ............ *G06F 21/305* (2013.01); *G06F 21/31* (2013.01); *H04N 1/00209* (2013.01);
(Continued)

(58) Field of Classification Search
CPC ....... G06F 21/305; G06F 21/31; H04N 5/232; H04N 5/23206; H04N 1/00244;
(Continued)

(56) References Cited

U.S. PATENT DOCUMENTS

| 2009/0201377 A1* | 8/2009 | Okano ............... H04N 1/00347 348/207.1 |
| 2015/0350520 A1 | 12/2015 | Yamashita |
| 2017/0272425 A1 | 9/2017 | Chen et al. |

FOREIGN PATENT DOCUMENTS

| CN | 105847243 A | | 8/2016 |
| JP | 2005190286 A | * | 7/2005 |
| JP | 2016-006952 | | 1/2016 |

OTHER PUBLICATIONS

The Extended European Search Report dated Feb. 2, 2018 for European Patent Application No. 17188956.1.

* cited by examiner

*Primary Examiner* — Yogesh K Aggarwal
(74) *Attorney, Agent, or Firm* — Greenblum & Bernstein, P.L.C.

(57) ABSTRACT

An image capturing control server receives permitted terminal identification information being first terminal identification information identifying a first image capturing terminal from an authentication server via a WAN, and sets the permitted terminal identification information as setting information for a communicator that communicates via a LAN. When receiving, via the LAN, second terminal identification information identifying a second image capturing terminal and image capturing control information for controlling an image capturing camera, the communicator determines whether the second image capturing terminal is the first image capturing terminal by determining whether the received second terminal identification information agrees with the first terminal identification information set as the permitted terminal identification information. When the communicator determines that the second image capturing terminal is the first image capturing terminal, a camera controller controls the image capturing camera in accor-
(Continued)

dance with the image capturing control information received along with the second terminal identification information.

8 Claims, 10 Drawing Sheets

(51) Int. Cl.
*H04N 1/00* (2006.01)
*H04N 5/232* (2006.01)
*H04N 7/18* (2006.01)
*G06K 9/00* (2006.01)
*H04W 12/06* (2009.01)

(52) U.S. Cl.
CPC ......... *H04N 1/00244* (2013.01); *H04N 5/232* (2013.01); *H04N 5/23206* (2013.01); *H04N 7/181* (2013.01); *H04N 7/185* (2013.01); *G06K 9/00671* (2013.01); *H04W 12/06* (2013.01)

(58) Field of Classification Search
CPC .... H04N 7/181; H04N 7/185; H04N 1/00209; H04N 9/735; H04N 5/23229; H04N 5/378; H04N 5/2258; H04N 5/23245; H04W 12/06; G06K 9/00671
USPC ...... 348/207.1, 207.11, 552, 222.1, 370–373
See application file for complete search history.

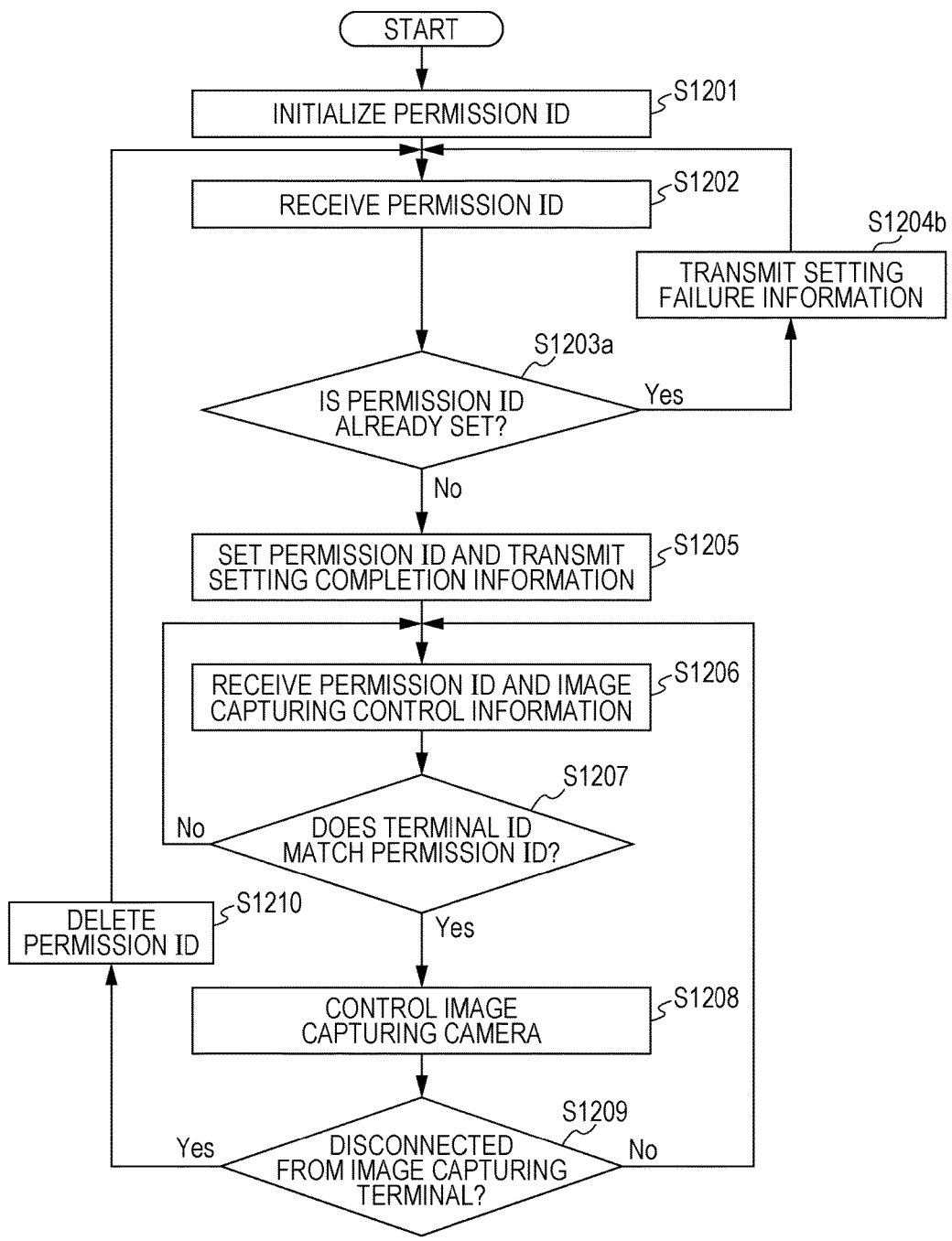

IMAGE CAPTURING CONTROL METHOD, IMAGE CAPTURING CONTROL SYSTEM, AND IMAGE CAPTURING CONTROL SERVER

BACKGROUND

1. Technical Field

The present disclosure relates to an image capturing control method, an image capturing control system, and an image capturing control server for capturing an image of a subject in a predetermined image capturing spot, and relates to an image capturing control method and the like for capturing an image using, for example, a remotely-operable image capturing camera installed in an image capturing spot in a theme park, an amusement facility, a sightseeing spot, or the like.

2. Description of the Related Art

There is a service under development which captures images with cameras that are installed at places where the users would want to have pictures or movies taken, such as an attraction in a theme park or an amusement facility, a structure such as a pavilion, or a sightseeing spot with an excellent scenery (such a place is hereinafter called an "image capturing spot"). With this service, a user may be able to take a better picture with less blur than with their own device such as a camera, or capture an image from a place where a user cannot enter. Such a service may thus be able to provide an image with which a user is happy.

As one example of such a service, there are many picture providing services where pictures of a user on a ride of an attraction in an amusement park are automatically taken using a sensor or the like just when the user passes a camera, and are then presented to the user to have the user pick one.

There is also a service that has a customer directly operate an installed camera. In one example of such a system, a user can capture an image by network-connecting their own mobile terminal (such as a smartphone) to an image capturing camera installed in an image capturing spot. In such a usage example, the image capturing camera needs to be operated by only one mobile terminal at once, and if the image capturing is for a commemorative purpose, a subject is desirably present near the image capturing spot.

In this regard, there is a remote image capturing system. In this system, in order for an operation terminal carried by a user to acquire the right to control an image capturing device, the system causes an authentication server to provide the operation terminal with a pattern to be displayed thereon, causes an image capturing device to read the screen of the terminal displaying the pattern, and checks whether the read pattern agrees with the provided pattern (see, for example, Japanese Unexamined Patent Application Publication No. 2016-6952). The image capturing control right is granted only when the system confirms that the terminal operated by the user is within the field of view of the image capturing device and is granted only to that terminal.

SUMMARY

In one general aspect, the techniques disclosed here feature an image capturing control method for an image capturing control system including an authentication server and an image capturing control server, the method including: the authentication server receiving first terminal identification information identifying a first image capturing terminal from the first image capturing terminal via a wide area network (WAN); the authentication server determining whether the first image capturing terminal identified by the received first terminal identification information is an image capturing terminal permitted to have an image captured by an image capturing camera via a local area network (LAN); when determining that the first image capturing terminal is an image capturing terminal permitted to have an image captured by the image capturing camera, the authentication server transmitting permitted terminal identification information to the image capturing control server via the WAN, the permitted terminal identification information being the first terminal identification information; the image capturing control server receiving the permitted terminal identification information from the authentication server via the WAN; the image capturing control server setting the permitted terminal identification information as setting information for a communicator that communicates via the LAN; when the communicator receives, from a second image capturing terminal via the LAN, second terminal identification information identifying the second image capturing terminal and image capturing control information for controlling the image capturing camera, the image capturing control server determining whether the second image capturing terminal is the first image capturing terminal by determining whether the received second terminal identification information agrees with the first terminal identification information set as the permitted terminal identification information; and when determining that the second image capturing terminal is the first image capturing terminal, the image capturing control server controlling the image capturing camera in accordance with the image capturing control information received along with the second terminal identification information.

According to the present disclosure, the image capturing control server can not only control the image capturing camera in accordance with image capturing control information received from an image capturing terminal permitted to have an image captured by the image capturing camera, but also enables stable image capturing operation by the image capturing terminal permitted to have an image captured by the image capturing camera.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 is a flowchart illustrating another example of a procedure by which the camera system in FIG. 5 operates.

DETAILED DESCRIPTION

Figure 1:
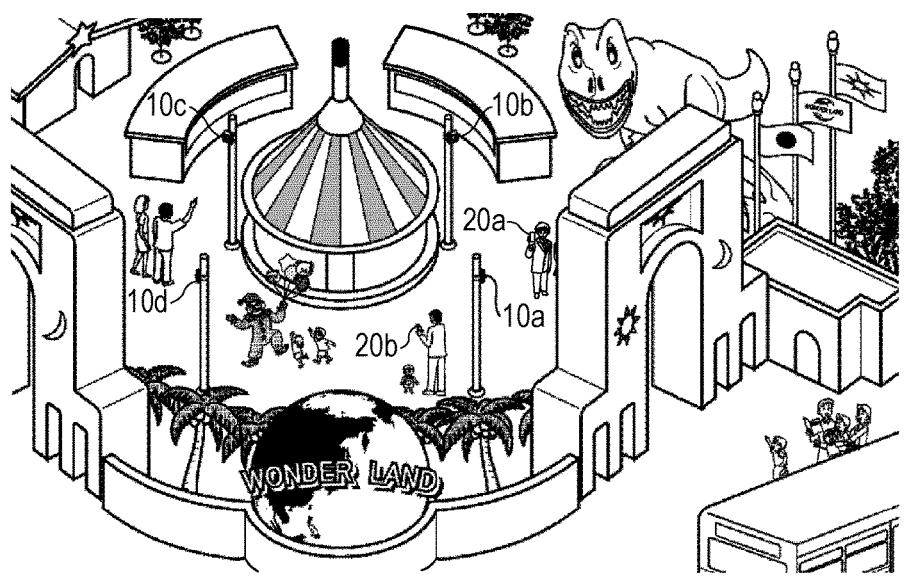
FIG. 1 is a diagram illustrating an example of a situation where an image capturing control system of the present disclosure is used.

Underlying Knowledge Forming Basis of the Present Disclosure

In the conventional remote image capturing system described earlier, possible communication means for the communications between the operation terminal and the authentication server or the like include, if the operation terminal is a mobile terminal, the Internet via a communications network provided by the communication carrier of the mobile terminal, or a wireless local area network (LAN) connection to the local area network of the remote image capturing system.

However, in an image capturing control system that captures an image by causing an image capturing terminal to control an image capturing camera, the following problems occur when the above-described communication means is used to acquire the image capturing control right and to control image capturing.

First, when the communication is carried out through the Internet, there are a large number of channels between the image capturing camera and the image capturing terminal; thus, a video transmitted from the image capturing camera to the image capturing terminal may delay, or the image capturing terminal used by a user may consume a large amount of data. Further, due to a data plan contracted with the communication carrier, communication speed may be limited.

Second, the connection via a wireless LAN may slow down communications because the bandwidth of the wireless LAN is shared with other users.

For these reasons, a further improvement has been needed for the above-described conventional remote image capturing system in terms of the communications among the image capturing device, the operation terminal, and the authentication server.

One non-limiting and exemplary embodiment provides an image capturing control method, an image capturing control system, and an image capturing control server in which, when an image capturing terminal controls an image capturing camera to capture an image, only an image capturing terminal permitted to control image capturing of the image capturing camera is allowed to connect to the image capturing control server, and the image capturing terminal can perform image capturing operation stably.

An image capturing control method according to an aspect of the present disclosure is the image capturing control method for an image capturing control system including an authentication server and an image capturing control server, the method including:

the authentication server receiving first terminal identification information identifying a first image capturing terminal from the first image capturing terminal via a wide area network (WAN);

the authentication server determining whether the first image capturing terminal identified by the received first terminal identification information is an image capturing terminal permitted to have an image captured by an image capturing camera via a local area network (LAN);

when determining that the first image capturing terminal is an image capturing terminal permitted to have an image captured by the image capturing camera, the authentication server transmitting permitted terminal identification information to the image capturing control server via the WAN, the permitted terminal identification information being the first terminal identification information;

the image capturing control server receiving the permitted terminal identification information from the authentication server via the WAN;

the image capturing control server setting the permitted terminal identification information as setting information for a communicator that communicates via the LAN;

when the communicator receives, from a second image capturing terminal via the LAN, second terminal identification information identifying the second image capturing terminal and image capturing control information for controlling the image capturing camera, the image capturing control server determining whether the second image capturing terminal is the first image capturing terminal by determining whether the received second terminal identification information agrees with the first terminal identification information set as the permitted terminal identification information; and when determining that the second image capturing terminal is the first image capturing terminal, the image capturing control server controlling the image capturing camera in accordance with the image capturing control information received along with the second terminal identification information.

According to this configuration, when first terminal identification information that the authentication server receives from a first image capturing terminal via the WAN identifies an image capturing terminal permitted to have an image captured by the image capturing camera, the authentication server transmits the first terminal identification information as permitted terminal identification information to the image capturing control server via the WAN. The image capturing control server then sets the received permitted terminal identification information in a communicator inside.

When receiving second terminal identification information identifying a second image capturing terminal and image capturing control information for controlling the image capturing camera from the second image capturing terminal via the LAN, the image capturing control server determines whether the second image capturing terminal is the first image capturing terminal by determining whether the received second terminal identification information agrees with the first terminal identification information set as the permitted terminal identification information. When determining that the second image capturing terminal is the first image capturing terminal, the image capturing control server controls the image capturing camera in accordance with the image capturing control information received along with the second terminal identification information.

Thus, only the first image capturing terminal permitted to have an image captured by the image capturing camera can communicate with the image capturing control server via the LAN, and this lessens the load on the LAN. As a result, when the image capturing terminal has an image captured by controlling the image capturing camera installed in an image capturing spot, the image capturing control server can not only control the image capturing camera in accordance with the image capturing control information received from the first image capturing terminal permitted to have an image captured by the image capturing camera, but also enables the first image capturing terminal to operate the image capturing stably.

The reception of the first terminal identification information from the first image capturing terminal and the reception and transmission of the permitted terminal identification information between the authentication server and the image capturing control server are carried out via the WAN. Thus, compared to a case where the reception and transmission of these kinds of data are carried out via the LAN, less load is put on the LAN. The first image capturing terminal can stably transmit the terminal ID and image capturing control information to the image capturing control server 11 via the LAN. Thus, the first image capturing terminal can stably operate the image capturing camera.

The setting may include setting, in the communicator, only the first terminal identification information received as the permitted terminal identification information.

According to this configuration, only the first terminal identification information is set in the communicator as permitted terminal identification information. Thus, an image capturing terminal that can communicate with the image capturing control server is only the single first image capturing terminal. Such a configuration puts less load on the LAN because the bandwidth does not have to be shared with other terminals. Further, a one-to-one network connection is established between the image capturing control server and an image capturing terminal carried by a user, or a subject, near the image capturing spot, so that communications with other image capturing terminals do not coexist. Thus, even more stable image capturing operation is possible.

The setting may include determining whether the authentication server that has transmitted the permitted terminal identification information is a predesignated authentication server. In addition, when determining that the authentication server is a predesignated authentication server, the setting may include setting the received permitted terminal identification information in the communicator.

According to this configuration, when the Internet is used as the WAN, even if the image capturing control server is attacked from the Internet through various kinds of communications, the image capturing control server does not need to handle any communication unless it is from a predesignated authentication server. Thus, load on the image capturing control server can be reduced.

The image capturing control method may further include:
after receiving the permitted terminal identification information from the authentication server, the image capturing control server determining whether additional permitted terminal identification information is received from the authentication server within a predetermined period of time, and
the setting the permitted terminal identification information in the communicator is performed when it is determined that no additional permitted terminal identification information is received from the authentication server within the predetermined period of time.

According to this configuration, even if more than one permitted terminal identification information is received consecutively within a predetermined period of time, the permitted terminal identification information with the latest reception time is set in the communicator.

The communicator may include a filter unit that permits only a set MAC address to be communicated therethrough. The first terminal identification information may indicate a MAC address of the first image capturing terminal, the second terminal identification information may indicate a MAC address of the second image capturing terminal. The determining may include determining that the second image capturing terminal is the first image capturing terminal when the MAC address of the second image capturing terminal agrees with the MAC address of the first image capturing terminal.

According to this configuration, the filter unit can filter information received by the communicator, so that the image capturing camera can be controlled in accordance with only the image capturing control information received from the first image capturing terminal identified by the first terminal identification information set as the permitted terminal identification information.

The filter unit may be formed using a circuit.

According to this configuration, the circuit forming the filter unit of the communicator can filter a communication made from an outside, so that only a communication made from a permitted image capturing terminal is accepted. This saves the image capturing control server a load on software processing.

The present disclosure can be implemented not only as an image capturing control method for executing the above characteristic processing, but also as an image capturing control system, an image capturing control server, and the like including characteristic configurations corresponding to the characteristic processing executed by the image capturing control method. Thus, the following other aspects can also provide effects similar to those provided by the above image capturing control method.

An image capturing control system according to another aspect of the present disclosure is the image capturing control system including:
an authentication server; and
an image capturing control server, in which
the authentication server includes
a receiver that receives first terminal identification information identifying a first image capturing terminal from the first image capturing terminal via a wide area network (WAN),
a controller that determines whether the first image capturing terminal identified by the received first terminal identification information is an image capturing terminal permitted to have an image captured by an image capturing camera via a local area network (LAN), and
a transmitter that, when the controller determines that the first image capturing terminal is an image capturing terminal permitted to have an image captured by the image capturing camera, transmits permitted terminal identification information to the image capturing control server via the WAN, the permitted terminal identification information being the first terminal identification information and the image capturing control server includes a first communicator that receives the permitted terminal identification information from the authentication server via the WAN;

a second communicator that communicates via the LAN, a setter that sets the received permitted terminal identification information as setting information for the second communicator, and a camera controller that controls an image capturing camera, when receiving, from a second image capturing terminal via the LAN, second terminal identification information identifying the second image capturing terminal and image capturing control information for controlling the image capturing camera, the second communicator determines whether the second image capturing terminal is the first image capturing terminal by determining whether the received second terminal identification information agrees with the first terminal identification information set as the permitted terminal identification information, when determining that the second image capturing terminal is the first image capturing terminal, the second communicator outputs the image capturing control information received via the LAN along with the second terminal identification information to the camera controller, and the camera controller controls the image capturing camera in accordance with the image capturing control information received.

An image capturing control server according to another aspect of the present disclosure is the image capturing control server including:

a first communicator that receives permitted terminal identification information from an authentication server via a wide area network (WAN);

a second communicator that communicates via a local area network (LAN);

a setter that sets the received permitted terminal identification information as setting information for the second communicator; and a camera controller that controls an image capturing camera, in which the permitted terminal identification information is first terminal identification information identifying a first image capturing terminal permitted by the authentication server to have an image captured by the image capturing camera via the LAN, when receiving, from a second image capturing terminal via the LAN, second terminal identification information identifying the second image capturing terminal and image capturing control information for controlling the image capturing camera, the second communicator determines whether the second image capturing terminal is the first image capturing terminal by determining whether the received second terminal identification information agrees with the first terminal identification information set as the permitted terminal identification information, when determining that the second image capturing terminal is the first image capturing terminal, the second communicator outputs the image capturing control information received via the LAN along with the second terminal identification information to the camera controller, and the camera controller controls the image capturing camera in accordance with the image capturing control information received.

The characteristic processing included in the image capturing control method above may be implemented as computer programs to be executed by a computer. Such computer programs can of course be distributed via a computer-readable, non-temporary recording medium such as a CD-ROM or via a communication network such as the Internet.

Each of the following embodiments is provided only for the purpose of presenting one specific example of the present disclosure. The numeric values, shapes, constituents, steps, and the order of the steps are mere examples, and are not intended to limit the present disclosure. In addition, among the constituents to be described in the following embodiments, ones that are not described in the independent claims, which provide the broadest concepts, are optional. Every embodiment may be combined with another embodiment.

An image capturing control system according to an embodiment of the present disclosure is described below with reference to the drawings.

1. Embodiment

An image capturing control system according to an embodiment of the present disclosure is a system for providing a service that allows a user to take a satisfying picture using an image capturing camera installed in an image capturing spot in a theme park, an amusement facility, a sightseeing spot, or the like.

(1-1. Overview)

FIG. 1 is a diagram illustrating an example of a situation where the image capturing control system according to the embodiment of the present disclosure is used. As illustrated in FIG. 1, remotely-operable camera systems 10*a* to 10*d* (hereinafter also referred to as a camera system 10) with a communication function are installed in respective image capturing spots. Certain users carry an image capturing terminals 20*a* or an image capturing terminal 20*b* (hereinafter also referred to as an image capturing terminal 20) with a communication function, such as a smartphone. The image capturing terminal 20 is not limited particularly to a smartphone, and may be other mobile terminals such as a tablet.

Figure 2:
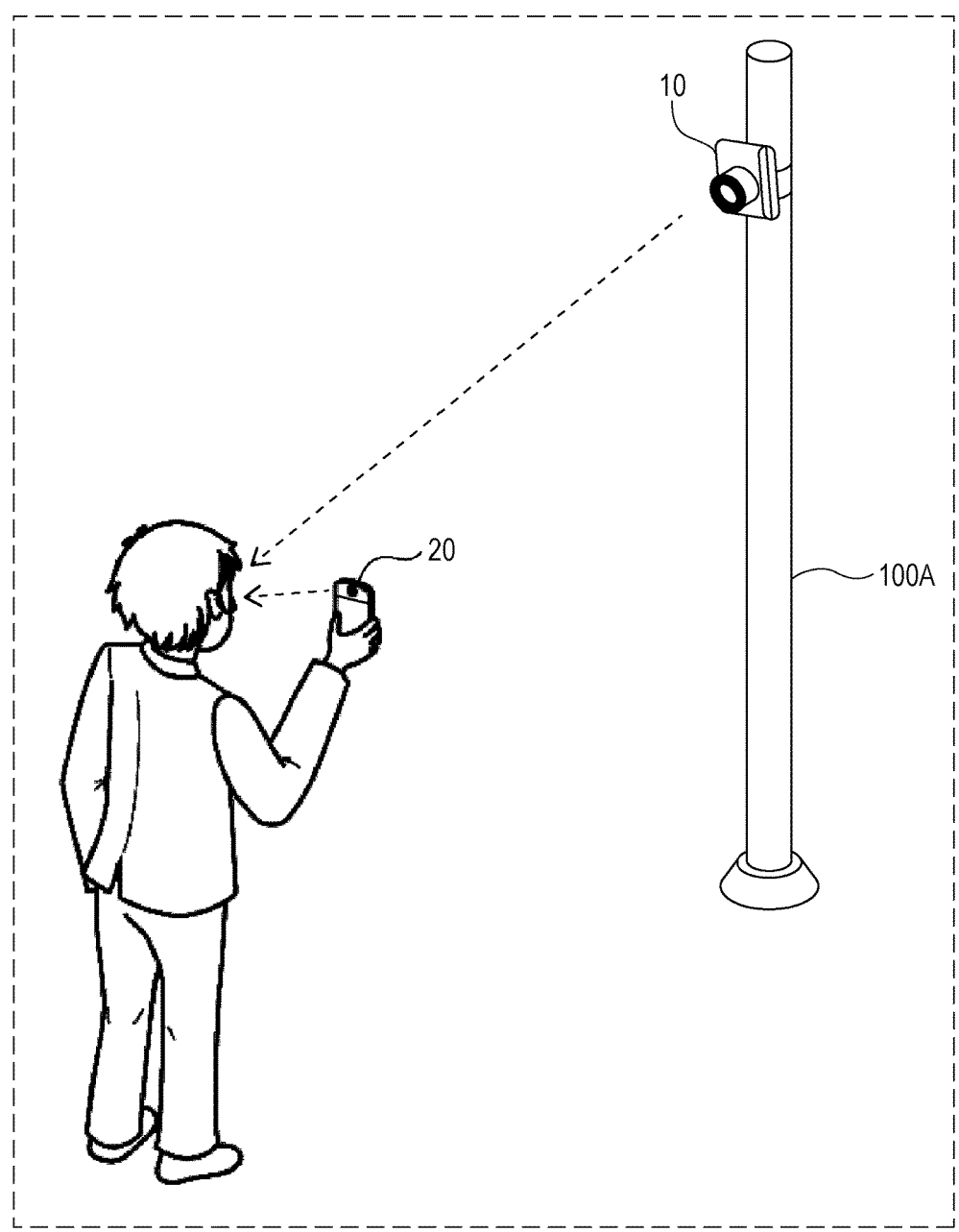
FIG. 2 is a diagram illustrating an example of how a user of the image capturing control system depicted in FIG. 1 behaves.

FIG. 2 is a diagram illustrating an example of how a user of the image capturing control system depicted in FIG. 1 acts. As illustrated in FIG. 2, the camera system 10 is installed in an image capturing spot by being attached to a pole 100A or the like at an angle capable of capturing an image of a user in the image capturing spot. The camera system 10 may be attached to a structure other than the pole 100A.

In order to capture an image by using the image capturing terminal 20 to control the camera system 10, the image capturing terminal 20 exclusive for image capturing is used, or a smartphone or the like carried by a user is used as the image capturing terminal 20 with an image capturing application program installed in the smartphone.

When a smartphone carried by a user is used as the image capturing terminal 20 as described above, the user carrying the image capturing terminal 20 performs image capturing while checking images captured by the camera system 10 and displayed on the image capturing terminal 20.

Figure 3:
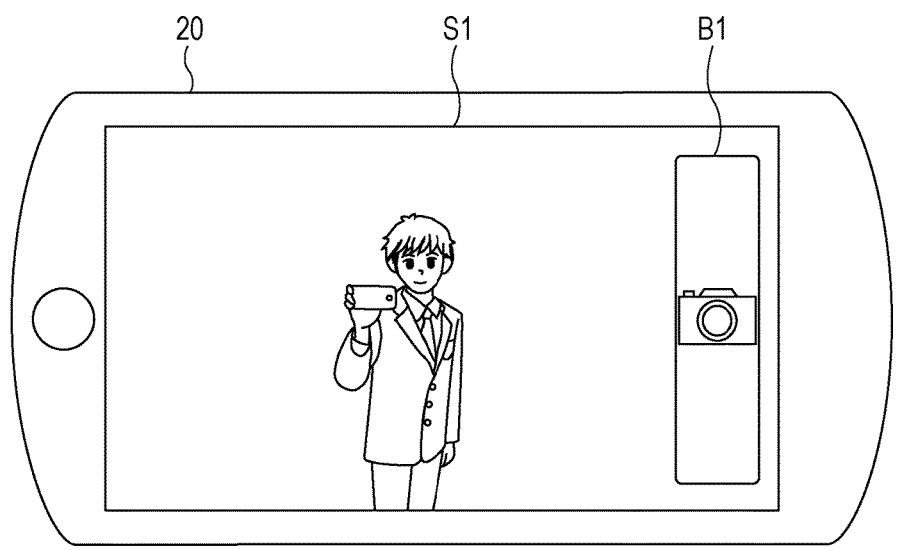
FIG. 3 is a diagram illustrating an example of a screen displayed on an image capturing terminal depicted in FIG. 2.

FIG. 3 is a diagram illustrating an example of a screen displayed on the image capturing terminal 20 depicted in FIG. 2. As illustrated in FIG. 3, in image capturing, images are sent from the camera system 10 and displayed on a screen S1 displayed on the image capturing terminal 20, and the user can have an image captured by touching a shutter button displayed at an end of the screen S1 while checking the images displayed on the screen S1.

If the camera system 10 releases the shutter as soon as the shutter button B1 is touched, a picture of the user looking at the image capturing terminal 20 may be taken. For this reason, the camera system 10 may be configured to release the shutter after an interval of several seconds passes after the touch operation. If the user operating the image capturing is not the subject (e.g., a family member of the user), the camera system 10 may release the shutter as soon as the shutter button B1 is touched.

Figure 4A:
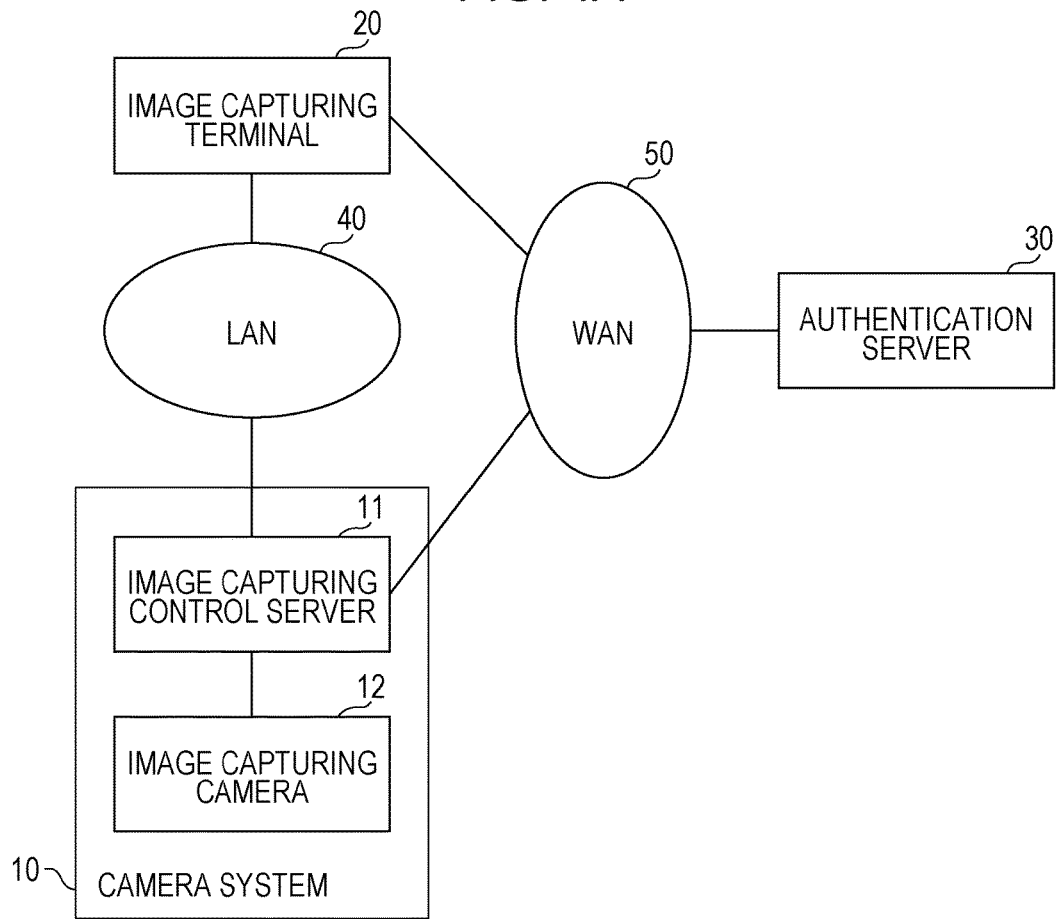
FIG. 4A is a diagram illustrating an example network configuration of the image capturing control system of the present disclosure.

FIG. 4A is a diagram illustrating an example network configuration of the image capturing control system according to the embodiment of the present disclosure. The image capturing control system illustrated in FIG. 4A includes the camera system 10, the image capturing terminal 20, and an authentication server 30. The camera system 10 includes, for example, an image capturing camera 12 and an image capturing control server 11 that controls operations of the image capturing camera 12. Examples of the operations of the image capturing camera 12 controlled include acquisition of a live-view video from the image capturing camera 12, capturing of a still image, capturing of moving images, zooming, and focusing.

Figure 4B:
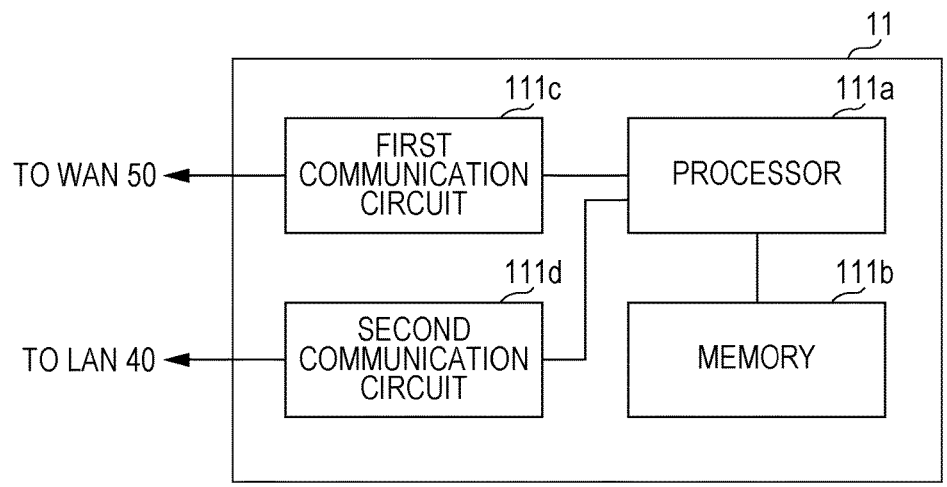
FIG. 4B is a diagram illustrating an example hardware configuration of an image capturing control server of the present disclosure.

FIG. 4B is a diagram illustrating an example hardware configuration of the image capturing control server 11.

The image capturing control server 11 is for example a computer, and includes, as its hardware configuration, a processor 111a such as a CPU, a memory 111b that stores programs and the like, a first communication circuit 111c that communicates via a wide area network (WAN) 50, and a second communication circuit 111d that communicates via a local area network (LAN) 40. The communication here includes transmission of information and reception of information. The first communication circuit 111c and the second communication circuit 111d may be physically integral with each other or separate from each other.

The processor 111a, the first communication circuit 111c, and the second communication circuit 111d may be physically integral with one another or separate from one another.

The memory 111b includes a data-writable recording medium. A recording medium is for example semiconductor memory or a hard disk. The memory 111b stores control programs, and when the processor 111a executes the control programs, the computer is implemented as the image capturing control server 11.

For example, a permission ID setter 13 and a camera controller 15, which will be described later, are implemented when the processor 111a executes the control programs.

Further, a first communicator 17, which will be described later, is implemented when the processor 111a executes the control programs to control the first communication circuit 111c. In addition, a camera communicator 14, which corresponds to a second communicator and will be described later, is implemented when the processor 111a executes the control programs to control the second communication circuit 111d.

The memory 111b may store a first communication program for implementing the first communicator 17. In this case, the first communicator 17 may be implemented when the first communication circuit 111c executes the first communication program.

The memory 111b may store a second communication program for implementing the camera communicator 14. In this case, the camera communicator 14 may be implemented when the second communication circuit 111d executes the second communication program.

The memory 111b may also include a storage area for storing, for example, information to be used by the computer implemented as the image capturing control server 11.

Figure 4C:
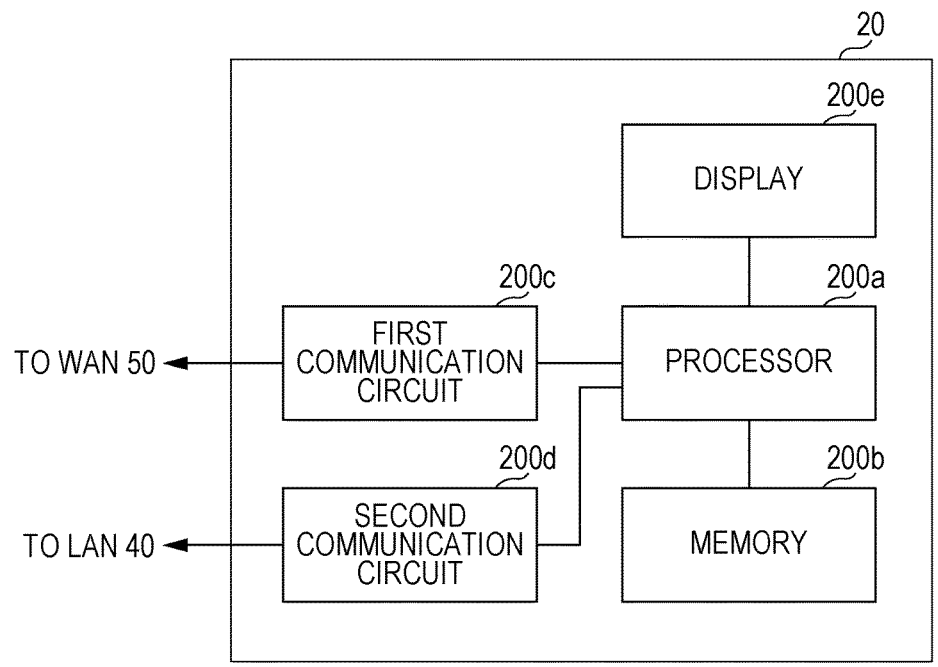
FIG. 4C is a diagram illustrating an example hardware configuration of an image capturing terminal of the present disclosure.

FIG. 4C is a diagram illustrating an example hardware configuration of the image capturing terminal 20.

The image capturing terminal 20 is for example a computer, and includes, as its hardware configuration, a processor 200a such as a CPU, a memory 200b that stores programs and the like, a first communication circuit 200c that communicates via the WAN 50, a second communication circuit 200d that communicates via the LAN 40, and a display 200e. The communication here includes transmission of information and reception of information. The first communication circuit 200c and the second communication circuit 200d may be physically integral with each other or separated from each other.

The processor 200a, the first communication circuit 200c, and the second communication circuit 200d may be physically integral with one another or separated from one another.

The memory 200b includes a data-writable recording medium. A recording medium is for example semiconductor memory or a hard disk. The memory 200b stores control programs, and when the processor 200a executes the control programs, the computer is implemented as the image capturing terminal 20.

For example, a terminal ID storage unit 22 and an image capturing controller 24, which will be described later, are implemented when the processor 200a executes the control programs.

Further, a first communicator 21, which will be described later, is implemented when the processor 200a executes the control programs to control the first communication circuit 200c. In addition, a second communicator 25, which will be described later, is implemented when the processor 200a executes the control programs to control the second communication circuit 200d.

The memory 200b may store a first communication program for implementing the first communicator 21. In this case, the first communicator 21 may be implemented when the first communication circuit 200c executes the first communication program.

The memory 200b may store a second communication program for implementing the second communicator 25. In this case, the second communicator 25 may be implemented when the second communication circuit 200d executes the second communication program.

The memory 200b may also include a storage area for storing, for example, information to be used by the computer implemented as the image capturing terminal 20. In the present embodiment, the memory 200b includes a storage area for storing the terminal ID of the image capturing terminal 20, which will be described as an example of the aforementioned information, and when the computer is implemented as the image capturing terminal 20, at least this storage area in the memory 200b serves as a terminal ID storage unit.

The display 200e may be a touch panel display. In this case, an operation-and-display unit 23, which will be described later, is implemented when the processor 200a executes the control programs to control the display 200e. The memory 200b may store a display program for implementing the operation-and-display unit 23. In this case, the operation-and-display unit 23 may be implemented when the display 200e executes the display program.

The image capturing terminal 20 may include an interface such as a keyboard.

Figure 4D:
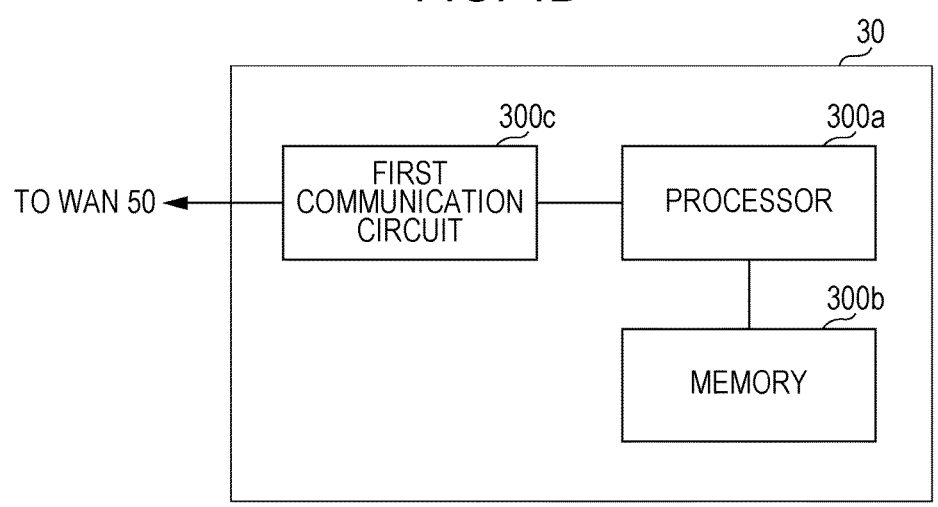
FIG. 4D is a diagram illustrating an example hardware configuration of an authentication server of the present disclosure.

FIG. 4D is a diagram illustrating an example hardware configuration of the authentication server 30.

The authentication server 30 is for example a computer, and includes, as its hardware configuration, a processor 300a such as a CPU, a memory 300b that stores programs and the like, and a first communication circuit 300c that communicates via the WAN 50. The communication here includes transmission of information and reception of information.

The processor 300a and the first communication circuit 300c may be physically integral with each other or separated from each other.

The memory 300b includes a data-writable recording medium. A recording medium is for example semiconductor memory or a hard disk. The memory 300b has programs recorded therein, and when the processor 300a executes the programs, the computer is implemented as the authentication server 30.

For example, a controller 32, which will be described later, is implemented when the processor 300a executes control programs.

A first communicator 31, which will be described later, is implemented when the processor 300a executes the control programs to control the first communication circuit 300c.

The memory 300b may store a first communication program for implementing the first communicator 31. In this case, the first communicator 31 may be implemented when the first communication circuit 300c executes the first communication program.

The memory 300b may also include a storage area for storing, for example, information to be used by the computer implemented as the authentication server 30. In the present embodiment, the memory 300b includes a storage area for storing the terminal ID of an image capturing terminal permitted to use the image capturing camera 12, which will be described as an example of the aforementioned information, and when the computer is implemented as the authentication server 30, at least this storage area in the memory 300b serves as a permitted terminal ID storage unit 33.

The camera system 10 and the image capturing terminal 20 are communicatively connected to each other via the LAN 40. When the image capturing terminal 20 and the camera system 10 are connected by the LAN 40, remote operation of the camera system 10 or specifically the image capturing camera 12 by the image capturing terminal 20 carried by a user can be achieved with fast and stable communications. A wireless connection is desirable for the communications between the image capturing terminal 20 and the camera system 10.

The image capturing terminal 20 and the authentication server 30 are communicatively connected to each other via the WAN 50. In the present embodiment, the Internet is used as the WAN 50, and therefore communication performance between the image capturing terminal 20 and the authentication server 30 are not as stable as the LAN 40. Particularly when the image capturing terminal 20 can use only a low-cost, low speed line as the WAN 50, it is difficult for the image capturing terminal 20 to acquire a real-time video from the camera system 10 via the WAN 50. The WAN 50 is not limited particularly to the Internet, and may be a wide area communication network using telephone lines, dedicated lines, or the like.

The camera system 10 and the authentication server 30 are communicatively connected to each other the WAN 50.

Thus, the authentication server 30 and the camera system 10 too are connected via the Internet. This Internet connection may be fast Internet connection using a wired dedicated line. However, there are many image capturing spots in sightseeing spots and the like with no Internet connection, and the connection between the authentication server 30 and the camera system 10 is likely to use a slow cell-phone communication network, as in the case with the image capturing terminal 20. In this way, the communications between the image capturing terminal 20 and the authentication server 30 and the communications between the camera system 10 and the authentication server 30 are not necessarily fast and stable.

In an image capturing spot where the image capturing control system having the above-described network connection is usable, a user carrying the image capturing terminal 20 uses the image capturing terminal 20 installed with an image capturing application program to communicate with the authentication server 30 and acquires the right to control the camera system 10. The user that has acquired the control right can operate the camera system 10 through the image capturing terminal 20 and have an image of the user themselves captured in the image capturing spot.

Captured data (still or moving images) may be saved by the camera system 10 into a predetermined cloud server via the Internet or the like or may be saved in the image capturing terminal 20. The embodiment does not limit where the captured data is to be saved.

(1-2. Configuration)

Figure 5:
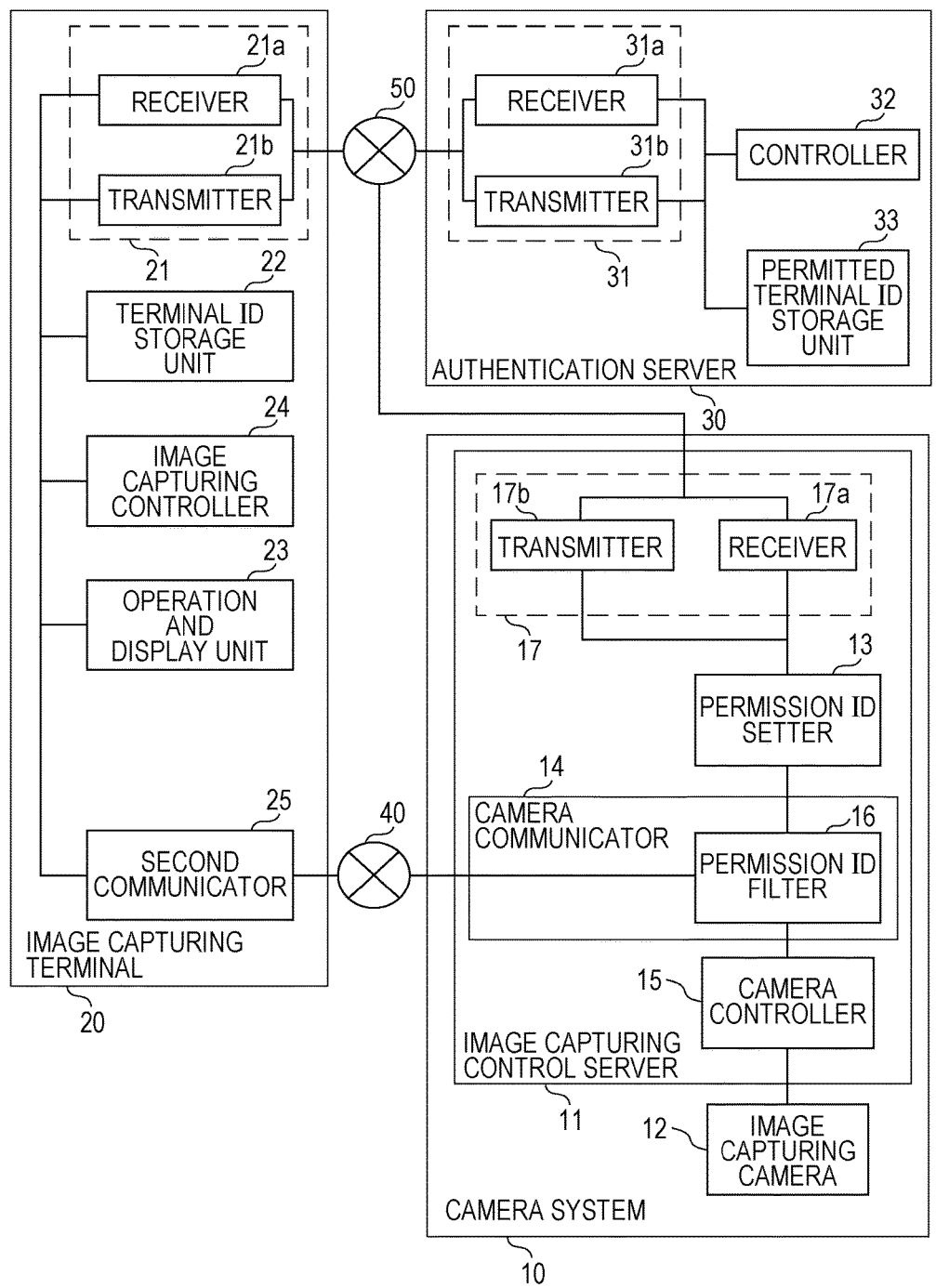
FIG. 5 is a block diagram illustrating an example configuration of the image capturing control system depicted in FIGS. 4A to 4D.

Next, a detailed description is given of the configuration of the image capturing control system according to the present embodiment. FIG. 5 is a block diagram illustrating an example functional configuration of the image capturing control system depicted in FIGS. 4A to 4D.

The image capturing control system illustrated in FIG. 5 includes the camera system 10, the image capturing terminal 20, and the authentication server 30. The camera system 10 includes the image capturing control server 11 and the image capturing camera 12.

The image capturing control server 11 includes the first communicator 17, the permission ID setter 13, which corresponds to the setter, the camera communicator 14, which corresponds to the second communicator, and the camera controller 15. The camera communicator 14 includes a permission ID filter 16, which corresponds to the filter unit.

The first communicator 17 includes a receiver 17a that receives information transmitted via for example the WAN 50 and a transmitter 17b that transmits information via the WAN 50.

The camera communicator 14 receives information transmitted via for example the LAN 40. The camera communicator 14 transmits information via the LAN 40.

The image capturing terminal 20 includes the first communicator 21, the terminal ID storage unit 22, the operation-and-display unit 23, the image capturing controller 24, and the second communicator 25.

The first communicator 21 includes a receiver 21a that receives information via for example the WAN 50 and a transmitter 21b that transmits information via the WAN 50.

The second communicator 25 receives information transmitted via for example the LAN 40. The second communicator 25 transmits information via the LAN 40. For example, the second communicator 25 may be formed by a device including the second communication circuit 200d. The device is for example a wireless LAN device.

The wireless LAN device may be a wireless LAN adapter. The wireless LAN device is preassigned a unique media access control (MAC) address, for example.

The terminal ID storage unit 22 includes at least part of the storage area of the memory 200b depicted in FIG. 4C.

The information that the image capturing terminal 20 transmits to the authentication server 30 is, for example, terminal identification information. Terminal identification information identifies the image capturing terminal 20 and unique to the image capturing terminal 20. The terminal identification information is also called a terminal ID. Herein, the image capturing terminal 20 may be referred to as a first image capturing terminal, and the terminal identification information on the image capturing terminal 20 may be referred to as first terminal identification information.

If there are a plurality of image capturing terminals, each image capturing terminal has a different terminal ID. To put it the other way around, if a terminal ID can be identified, an image capturing terminal can be identified uniquely by the terminal ID.

The operation-and-display unit 23 is for example a touch panel display that displays, for example, an operation screen for a user to input various kinds of operational instructions, and receives, for example, the instructions inputted by the user on this operation screen. For example, the operation-and-display unit 23 receives an instruction from a user to transmit a terminal ID, and then instructs the first communicator 21 to transmit the terminal ID. Note that the configuration of the operation-and-display unit 23 is not limited to the above example, and may be variously modified. In one modification, the operation unit and the display unit may be separate devices.

The terminal ID storage unit 22 stores, for example, a MAC address in advance as the terminal ID of the image capturing terminal 20. In accordance with the terminal ID transmission instruction from the user, the transmitter 21b transmits the terminal ID of the image capturing terminal 20 read from the terminal ID storage unit 22 to the authentication server 30 or more specifically a receiver 31a via the WAN 50.

When the image capturing terminal 20 is a mobile terminal such as a smartphone, examples of the terminal ID include, besides the MAC address, the individual identification number of the smartphone and a service account for using the service provided by the camera system 10. In the present embodiment, the terminal ID is the MAC address of the wireless LAN device (the second communicator 25). The service provided by the camera system 10 is, for example, to use the camera system 10 via the LAN 40, or more specifically, to view or acquire still or moving images or the like covering the image capturing spot and captured by the image capturing camera 12 by remotely controlling the operation of the image capturing camera 12 through the image capturing control server 11.

The authentication server 30 includes the first communicator 31, the controller 32, and the permitted terminal ID storage unit 33.

For example, the permitted terminal ID storage unit 33 includes at least part of the storage area of the memory 300b depicted in FIG. 4D.

For example, in the authentication server 30, information on an image capturing terminal permitted to have an image captured by the image capturing camera 12 is stored beforehand in the permitted terminal ID storage unit 33. Herein, the information on an image capturing terminal permitted to have an image captured by the image capturing camera 12 may be referred to as information on an image capturing terminal permitted to use the camera system 10. This information is a list of terminal IDs of image capturing terminals permitted to have an image captured by the image capturing camera 12, or in other words, a list of terminal IDs of image capturing terminals permitted to use the camera system 10.

For instance, if a terminal ID received is a MAC address, the list includes the MAC addresses of the image capturing terminals 20 permitted to use the camera system 10.

The receiver 31a of the authentication server 30 receives a terminal ID from the image capturing terminal 20 via the WAN 50, and outputs the terminal ID to the controller 32. The controller 32 determines whether the image capturing terminal 20 identified by the received terminal ID is an image capturing terminal permitted to use the camera system 10, or more specifically, is an image capturing terminal permitted to have an image captured by the image capturing camera 12.

For example, the controller 32 refers to the list stored in the permitted terminal ID storage unit 33 and checks if the list has a terminal ID that agrees with the received terminal ID. If the list has a terminal ID that agrees with the received terminal ID, the controller 32 determines that the image capturing terminal 20 identified by the received terminal ID is an image capturing terminal permitted to use the camera system 10, or in other words, an image capturing terminal permitted to have an image captured by the image capturing camera 12.

If, on the other hand, the list does not have a terminal ID that agrees with the received terminal ID, the controller 32 determines that the image capturing terminal 20 identified by the received terminal ID is an image capturing terminal not permitted to use the camera system 10, or in other words, not permitted to have an image captured by the image capturing camera 12.

When determining that the image capturing terminal 20 identified by the received terminal ID is an image capturing terminal that can use the camera system 10, the controller 32 instructs a transmitter 31b to transmit use permission information to the image capturing terminal 20. The use permission information is information indicating that the image capturing terminal 20 can use the camera system 10 or the image capturing camera 12. Instructed, the transmitter 31b transmits use permission information to the image capturing terminal 20 via the WAN 50.

The controller 32 also instructs the transmitter 31b to transmit a permission ID to the image capturing control server 11, the permission ID being the received terminal ID. Instructed, the transmitter 31b transmits the permission ID to the image capturing control server 11 via the WAN 50.

A permission ID is the terminal ID of an image capturing terminal determined by the controller 32 as being permitted to use the camera system 10.

Upon receipt of the permission ID, the image capturing control server 11 sets the permission ID as setting information for the camera communicator 14. A description will be given later regarding this setting of the permission ID.

When, on the other hand, determining that the image capturing terminal 20 identified by the received terminal ID is not permitted to use the camera system 10, the controller 32 instructs the transmitter 31b to transmit use refusal information to the image capturing terminal 20. The use refusal information is information indicating that the image capturing terminal 20 cannot use the camera system 10 or the image capturing camera 12. Instructed, the transmitter 31b transmits use refusal information to the image capturing terminal 20 via the WAN 50.

In the above example, the list of terminal IDs of image capturing terminals permitted to have an image captured by the image capturing camera 12 is stored beforehand in the permitted terminal ID storage unit 33 of the authentication server 30, and the determination is made based on whether the list has a terminal ID agreeing with the received terminal ID. The present disclosure is, however, not limited to such a configuration.

After the controller 32 instructs the transmitter 31b to transmit a permission ID to the image capturing control server 11, the receiver 31a may receive information from the image capturing control server 11, the information indicating whether the permission ID has actually been set. For example, the controller 32 may receive this information from the receiver 31a and determine based on this information whether the image capturing terminal 20 is an image capturing terminal that can use the camera system 10.

The transmitted permission ID is not set in the image capturing control server 11 when, for example, an image capturing terminal different from the image capturing terminal 20 is already using the image capturing camera 12 on the image capturing control server 11.

Note that the information stored in the permitted terminal ID storage unit 33 is not limited particularly to this example (i.e., a list), and various modifications can be made in this regard. For example, if a different type of identification information is used as a terminal ID, such as an individual identification number or a service account used by the image capturing terminal 20 to use the camera system 10, the authentication server 30 may have a table in the permitted terminal ID storage unit 33, the table having the identification information in association with a MAC address. In this case, the controller 32 may read a MAC address associated with the received identification information from the permitted terminal ID storage unit 33, and instruct the transmitter 31b to transmit the read MAC address to the image capturing control server 11 as a permission ID.

The first communicator 17 of the image capturing control server 11 includes the receiver 17a and the transmitter 17b. The receiver 17a receives information transmitted from the authentication server 30 via the WAN 50. Examples of the Information received from the authentication server 30 include a permission ID, which is the terminal ID of the image capturing terminal 20. The receiver 17a outputs the permission ID received from the authentication server 30 to the permission ID setter 13.

The permission ID setter 13 sets the received permission ID in the camera communicator 14 as setting information.

For instance, if only one image capturing terminal 20 is allowed to control image capturing, the permission ID setter 13 deletes all the permission IDs set to that point, and then sets only the permission ID received from the authentication server 30 the last, i.e., the latest permission ID, in the permission ID filter 16 of the camera communicator 14.

If the camera system 10 (the image capturing control server 11) can allow n image capturing terminals 20 (where n is an integer of two or more) to control image capturing at the same time, the permission ID setter 13 may set n permission IDs.

In addition, if the camera system 10 (the image capturing control server 11) receives a permission ID from more than one authentication server 30, the permission ID setter 13 may determine, based on identification information on pre-designated authentication servers stored in internal memory or the like, whether the authentication server having transmitted the permission ID is a predesignated authentication server. The permission ID setter 13 may set a permission ID received from the receiver 17a in the permission ID filter 16 only when determining that the authentication server having transmitted the permission ID is a predesignated authentication server. In addition, if the image capturing control server 11 controls more than one image capturing camera 12, the permission ID setter 13 may set one or more permission IDs for each image capturing camera 12.

In the image capturing terminal 20 that has received the use permission information, the image capturing controller 24 instructs the second communicator 25 to transmit, to the camera system 10, the terminal ID of the image capturing terminal 20 read from the terminal ID storage unit 22 and image capturing control information concerning the image capturing camera 12, which is based on image capturing operation inputted by a user through the operation-and-display unit 23. Instructed, the second communicator 25 transmits the terminal ID and the image capturing control information to the camera system 10, or more specifically the camera communicator 14 of the image capturing control server 11, via the LAN 40.

When receiving from the image capturing terminal 20 its terminal ID and image capturing control information via the LAN 40, the camera communicator 14 determines whether the received terminal ID agrees with the permission ID set in the permission ID filter 16, and thereby determines whether the image capturing terminal having transmitted the terminal ID and the image capturing control information via the LAN 40 is an image capturing terminal identified by the permission ID.

The permission ID set in the permission ID filter 16 is, as described earlier, the terminal ID of the image capturing terminal 20.

The permission ID filter 16 holds a set permission ID as a list, and checks if the list has the permission ID agreeing with the received terminal ID. In the present embodiment, only one permission ID is set in the permission ID list as described earlier, and therefore the permission ID filter 16 checks the received terminal ID against only that permission ID.

When the received terminal ID agrees with the permission ID, it means that the image capturing terminal identified by the terminal ID received via the LAN 40 is the image capturing terminal 20 identified by the permission ID, or in other words, that the image capturing terminal having transmitted the terminal ID and the image capturing control information via the LAN 40 is the image capturing terminal 20.

Only when the received terminal ID agrees with the permission ID, the camera communicator 14 outputs the image capturing control information received via the LAN 40 along with the terminal ID, to the camera controller 15 through the permission ID filter 16. In the present embodiment, the terminal ID of the image capturing terminal 20 is the MAC address of the wireless LAN device corresponding to the second communicator 25 of the image capturing terminal 20. In addition, a MAC address set as the permission ID is the MAC address of the image capturing terminal 20.

Thus, the permission ID filter 16 performs filtering using the MAC address set as the permission ID, and thereby outputs, to the camera controller 15, only the image capturing control information received along with the MAC address agreeing with the MAC address set as the permission ID.

Many kinds of hardware for the filtering of communication using a MAC address are in the market. In the present embodiment, for example, the permission ID filter 16 may be implemented using hardware, for example a filter circuit, that performs communication filtering using a MAC address.

The camera controller 15 controls the image capturing camera 12 according to the image capturing control information received from the camera communicator 14. For example, the image capturing control information includes control information such as acquisition of live-view video from the image capturing camera 12, capturing still images, capturing moving images, zooming, and focusing, and using such control information, the image capturing terminal 20 can control various functions of the image capturing camera 12.

The image capturing control server 11 can thus control image capturing of the image capturing camera 12 in accordance with only the image capturing control information transmitted from the image capturing terminal 20 via the LAN 40.

Although the camera system 10 includes the image capturing control server 11 and the image capturing camera 12 in the present embodiment, the present disclosure is not limited particularly to such an example configuration. The image capturing control server 11 and the image capturing camera 12 may be separated and disposed at different locations, or one image capturing control server 11 may control more than one image capturing camera 12. In such cases, the image capturing control server 11 and the image capturing camera 12 are desirably connected by a wired or wireless LAN. In addition, although the authentication server 30 is described as a separate server from the image capturing control server 11, the present disclosure is not limited particularly to such an example. An authentication and image capturing control server integrally having the authentication server 30 and the image capturing control server 11 may be used.

(1-3. Operation)

Next, a description is given of how the image capturing control system illustrated in FIG. 5 operates. The operation of the image capturing control system is a combination of the operations of the image capturing terminal 20, the authentication server 30, and the camera system 10.

Figure 6:
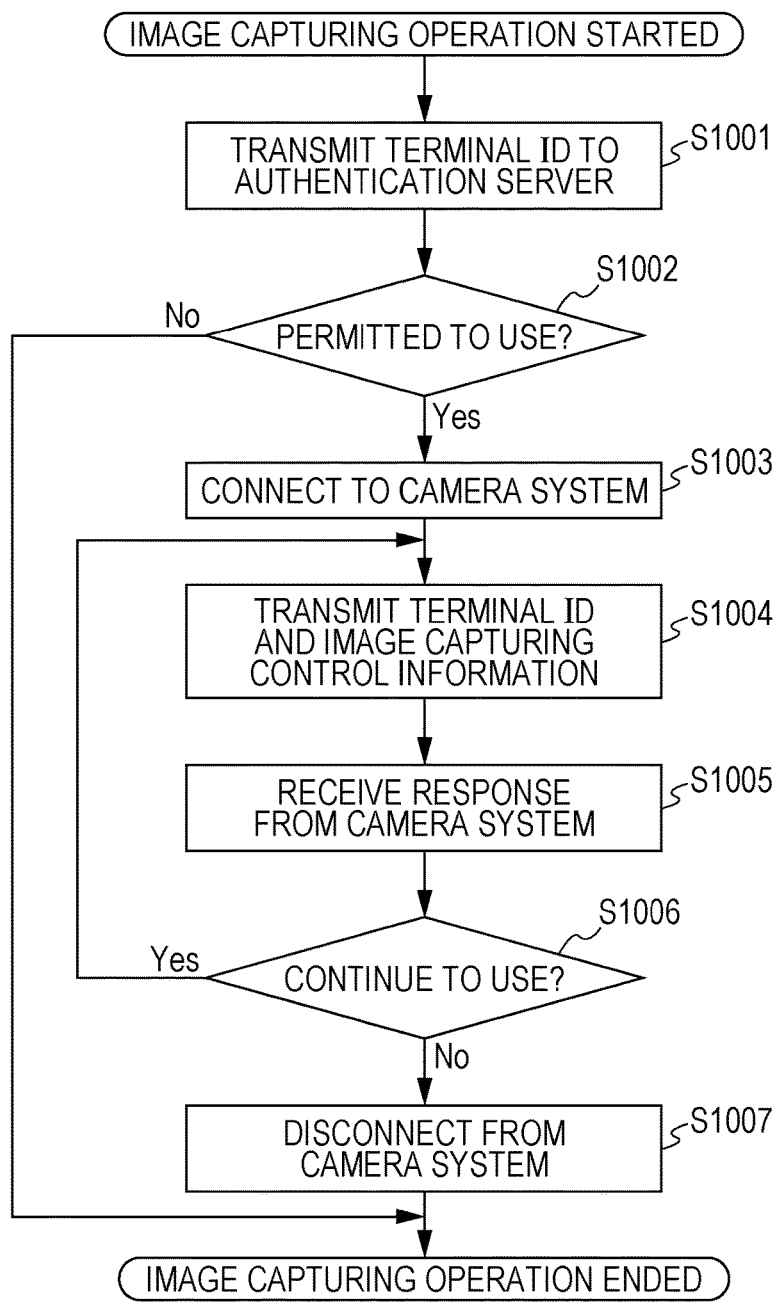
FIG. 6 is a flowchart illustrating an example of a procedure by which the image capturing terminal depicted in FIG. 5 operates.

First, using a flowchart in FIG. 6, a description is given of how the image capturing terminal 20 operates. FIG. 6 is a flowchart illustrating an example of a procedure by which the image capturing terminal 20 depicted in FIG. 5 operates.

An image capturing operation performed through the image capturing terminal 20 consists roughly of two procedures: registering a terminal ID on the authentication server 30 and controlling image capturing by the camera system 10. First, the first communicator 21 transmits a terminal ID to the first communicator 31 of the authentication server 30 (Step S1001). When the receiver 31a receives the terminal ID, the controller 32 of the authentication server 30 determines whether the image capturing terminal 20 corresponding to the terminal ID is an image capturing terminal permitted to use the camera system 10, or in other words, an image capturing terminal permitted to have an image captured by the image capturing camera 12.

When determining that the image capturing terminal 20 is an image capturing terminal permitted to use the camera system 10, or in other words, an image capturing terminal permitted to have an image captured by the image capturing camera 12, the controller 32 instructs the transmitter 31b to transmit use permission information to the image capturing terminal 20. Instructed, the transmitter 31b transmits use permission information to the image capturing terminal 20 via the WAN 50.

The image capturing terminal 20 is not permitted to use the camera system 10 when, for example, the list in the permitted terminal ID storage unit 33 of the authentication server 30 does not have a terminal ID that agrees with the terminal ID of the image capturing terminal 20, or when a different terminal (not shown) is using the camera system 10. In such cases, the controller 32 instructs the transmitter 31b to transmit use refusal information to the image capturing terminal 20. Instructed, the transmitter 31b transmits use refusal information to the image capturing terminal 20 via the WAN 50.

Next, the receiver 21a of the image capturing terminal 20 receives the use permission or refusal information from the authentication server 30, and based on that information, determines whether the image capturing terminal 20 has been permitted to use the camera system 10 (Step S1002). If the image capturing terminal 20 has been permitted to use the camera system 10, or in other words, when receiving use permission information (Yes in Step S1002), the receiver 21a outputs the received use permission information to the image capturing controller 24 and proceeds to Step S1003. If, on the other hand, the image capturing terminal 20 is not permitted to use the camera system 10, or in other words, when receiving use refusal information (No in Step S1002), the image capturing terminal 20 cannot have an image captured by the camera system 10, and hence ends the processing.

If the image capturing terminal 20 is permitted to use the camera system 10 (Yes in Step S1002), the image capturing controller 24 of the image capturing terminal 20 uses the second communicator 25 to connect to the camera system 10 via the LAN 40 (Step S1003). The LAN 40 is a wireless network, and for example, the camera communicator 14 of the camera system 10 is a wireless LAN adapter. In this example, the image capturing terminal 20 connects to the camera system 10 as a client by using a wireless LAN function of the second communicator 25. Such a connection to a wireless LAN is typically carried out after authentication is performed based on a password and an identifier called a service set identifier (SSID), but the authentication does not necessarily have to be performed in the present embodiment.

Next, the image capturing controller 24 transmits, using the second communicator 25, its own terminal ID read from the terminal ID storage unit 22 and image capturing control information to the image capturing control server 11 via the LAN 40, the image capturing control information being based on an image capturing instruction a user has inputted through the operation-and-display unit 23 (Step S1004). Since the terminal ID in the present embodiment is the MAC address of the wireless LAN device corresponding to the second communicator 25, the MAC address is transmitted to the camera system 10 over the LAN 40 in the data link layer (the second layer), and the image capturing control information is transmitted in the application layer (the seventh layer). This communication layering is defined by International Organization for Standardization (ISO), and therefore not described in detail herein. It is also possible to transmit the MAC address, or the terminal ID, in the application layer by defining a unique protocol for communications with the camera system 10.

The camera communicator 14 of the camera system 10 receives the terminal ID and the image capturing control information from the image capturing terminal via the LAN 40. When the camera communicator 14 receives the terminal ID and the image capturing control information via the LAN 40, it is yet to be determined whether the image capturing terminal having transmitted the terminal ID and the image capturing control information via the LAN 40 is the image capturing terminal 20.

To clarify this, hereinafter, an image capturing terminal 20 identified by a terminal ID received as a permission ID from the authentication server 30 via the WAN 50 is referred to as a first image capturing terminal, and an image capturing terminal transmitting a terminal ID and image capturing control information via the LAN 40 is referred to as a second image capturing terminal.

The camera communicator 14 determines whether the terminal ID received via the LAN 40 agrees with a permission ID set as setting information and thereby determines whether the second image capturing terminal identified by the terminal ID received via the LAN 40 is a first image capturing terminal, or specifically, the image capturing terminal 20 identified by the permission ID. When determining that an image capturing terminal identified by the terminal ID received via the LAN 40 is the image capturing terminal 20, the camera communicator 14 outputs the image capturing control information received via the LAN 40, to the camera controller 15. Receiving the image capturing control information from the camera communicator 14, the camera controller 15 controls the image capturing camera 12 based on the image capturing control information. The image capturing camera 12 outputs a response for the control based on the image capturing control information to the camera communicator 14, and the camera communicator 14 transmits the received response to the image capturing terminal 20.

Next, the image capturing controller 24 receives the response from the camera system 10 using the second communicator 25 (Step S1005). For example, in a case where the image capturing control information transmitted from the image capturing controller 24 using the second communicator 25 is image capturing control information indicating acquisition of live-view moving images of the user in the image capturing spot captured by the image capturing camera 12, the image capturing controller 24 acquires, as the response from the camera system 10, the live-view moving images received by the second communicator 25. The live-view moving images thus acquired are displayed as a video (captured images) on the screen S1 of the image capturing terminal 20 depicted in FIG. 3. A user that operates the hand-held image capturing terminal 20 for image capturing can decide on the photo composition or a pose while looking at these captured images.

In a case where the image capturing control information transmitted from the image capturing controller 24 to the image capturing camera 12 using the second communicator 25 is shutter control information, the image capturing camera 12 captures a still image. For instance, triggered by the user touching the shutter button B1 in FIG. 3, the image capturing terminal 20 sends the camera system 10 shutter control information, instructing the image capturing camera 12 to perform an image capturing operation according to the operation by the user. Data on the still image thus captured can be not only returned to the image capturing terminal 20 as a response, but also, depending on the specifications of the camera system 10, saved in a predetermined cloud server or the like while being linked to the terminal ID of the image capturing terminal 20. The present embodiment does not limit how content such as a captured still image is saved.

After finishing the series of image capturing operation, the user operates the operation-and-display unit 23 of the image capturing terminal 20 to determine whether to perform another image capturing control. The operation-and-display unit 23 then outputs, to the image capturing controller 24, information instructing whether to perform another image capturing control. In response to the instruction information from the operation-and-display unit 23, the image capturing controller 24 determines whether to continue using the camera system 10 (Step S1006). When the user is going to continue using the camera system 10 for another image capturing operation (Yes in Step S1006), the image capturing controller 24 proceeds to Step S1004 and follow the flowchart from there. When the user is not going to continue using the camera system 10 for another image capturing operation (No in Step S1006), the image capturing controller 24 uses the second communicator 25 to terminate the network communications with, or the wireless LAN connection to, the camera system 10, disconnecting the network connection to the camera system 10 (Step S1007). The image capturing operation by the image capturing terminal 20 is thus ended by the network disconnection from the camera system 10.

Figure 7:
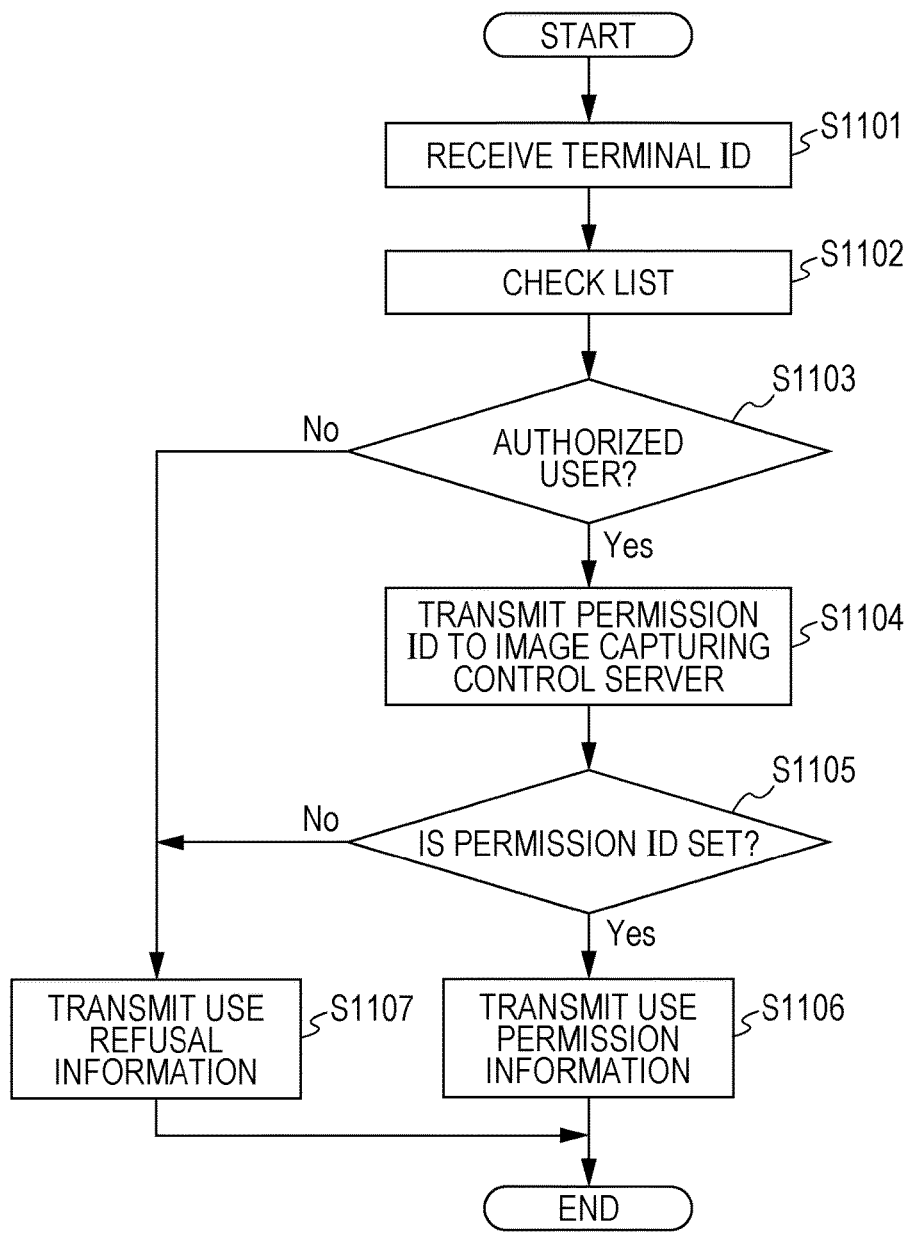
FIG. 7 is a flowchart illustrating an example of a procedure by which the authentication server depicted in FIG. 5 operates.

Next, using a flowchart in FIG. 7, a description is given of how the authentication server 30 operates. FIG. 7 is a flowchart illustrating an example of a procedure by which the authentication server 30 depicted in FIG. 5 operates.

First, the receiver 31*a* of the authentication server 30 receives a terminal ID from the image capturing terminal 20 via the WAN 50, and outputs the received terminal ID to the controller 32 (Step S1101). Next, the controller 32 refers to the list stored in the permitted terminal ID storage unit 33 in advance. The list contains terminal IDs of image capturing terminals permitted to use the camera system 10. The controller 32 checks if the list has a terminal ID that agrees with the terminal ID received in Step S1101 (Step S1102).

Next, the controller 32 determines, based on a result of the checking in Step S1102, whether the image capturing terminal 20 identified by the terminal ID received in Step S1101 is an image capturing terminal permitted to use the camera system 10, or in other words, whether the image capturing terminal 20 is an image capturing terminal permitted to have an image captured by the image capturing camera 12.

This determination whether the image capturing terminal 20 is an image capturing terminal permitted to use the camera system 10 is also referred to as determination whether the image capturing terminal 20 is authorized to use the camera system 10 (Step S1103).

When determining as a result of the list checking in Step S1102 that the list does not have a terminal ID that agrees with the terminal ID received in Step S1101, the controller 32 determines that the image capturing terminal 20 is an image capturing terminal not permitted to use the camera system 10, or in other words, that the image capturing terminal 20 is an image capturing terminal not permitted to have an image captured by the image capturing camera 12.

In this case, the controller 32 determines that the image capturing terminal 20 is not authorized to use the camera system 10 (No in Step S1103), and thus instructs the transmitter 31*b* to transmit use refusal information. Instructed, the transmitter 31*b* transmits use refusal information to the image capturing terminal 20 via the WAN 50 (Step S1107), and ends the processing.

When determining as a result of the list checking in Step S1102 that the list has a terminal ID that agrees with the terminal ID received in Step S1101, the controller 32 determines that the image capturing terminal 20 is an image capturing terminal permitted to use the camera system 10, or in other words, that the image capturing terminal 20 is an image capturing terminal permitted to have an image captured by the image capturing camera 12.

In this case, the controller 32 determines that the image capturing terminal 20 is authorized to use the camera system 10 (Yes in Step S1103), and therefore instructs the transmitter 31*b* to transmit a permission ID which is the terminal ID received in Step S1101. Instructed, the transmitter 31*b* transmits the permission ID to the image capturing control server 11 via the WAN 50 (Step S1104), and proceeds to Step S1105.

Meanwhile in the camera system 10, receiving the permission ID from the authentication server 30, the receiver 17*a* of the image capturing control server 11 outputs the received permission ID to the permission ID setter 13. Receiving the permission ID, the permission ID setter 13 determines whether the image capturing terminal 20 can currently use the camera system 10, or in other words, whether the image capturing terminal 20 can currently have an image captured by the image capturing camera 12.

For instance, if the camera system 10 is not being used by an image capturing terminal other than the image capturing terminal 20 at the time of the reception of the permission ID, the permission ID setter 13 determines that the image capturing terminal 20 can use the camera system 10, or in other words, that the image capturing terminal 20 can have an image captured by the image capturing camera 12.

In this case, the permission ID setter 13 sets the permission ID in the permission ID filter 16. The permission ID setter 13 instructs the transmitter 17*b* to transmit setting completion information to the authentication server 30. Setting completion information is information indicating that setting of the permission ID is complete. Instructed, the transmitter 17*b* transmits setting completion information to the authentication server 30 via the WAN 50.

On the other hand, if the camera system 10 is being used by an image capturing terminal other than the image capturing terminal 20 at the time of the reception of the permission ID, the permission ID setter 13 determines that the image capturing terminal 20 cannot currently use the camera system 10, or in other words, that the image capturing terminal 20 cannot currently have an image captured by the image capturing camera 12.

In the present embodiment, only one permission ID can be set in the permission ID filter 16. Thus, if the camera system 10 is being used by an image capturing terminal other than the image capturing terminal 20, the permission ID setter 13 cannot set the received permission ID in the permission ID filter 16 anymore. In this case, the permission ID setter 13 instructs the transmitter 17*b* to transmit setting failure information to the authentication server 30. Setting failure information indicates that the permission ID setter 13 failed in setting the permission ID. Instructed, the transmitter 17*b* transmits setting failure information to the authentication server 30 via the WAN 50.

Next, the controller 32 determines whether the permission ID that it has instructed to transmit has been set in the permission ID filter 16 of the image capturing control server 11. More specifically, the receiver 31*a* receives information as a response to the permission ID transmitted from the transmitter 31*b* to the image capturing control server 11, and outputs the received information to the controller 32. Information received as a response is either the setting completion information or setting failure information. The controller 32 determines whether the transmitted permission ID has been set in the permission ID filter 16 of the image capturing control server 11, based on whether the information received via the receiver 31*a* is the setting completion information or the setting failure information.

In this way, based on the information received from the transmitter 17*b* of the image capturing control server 11, the controller 32 determines whether the permission ID has been set in the permission ID filter 16 (Step S1105).

If the terminal ID of the image capturing terminal 20 is set in the permission ID filter 16 of the image capturing control server 11 as a permission ID, or in other words, if the controller 32 receives the setting completion information (Yes in S1105), the controller 32 instructs the transmitter 17*b* to transmit use permission information to the image capturing terminal. Instructed, the transmitter 31*b* transmits use permission information to the image capturing terminal via the WAN 50 (Step S1106), and ends the processing.

If, on the other hand, the terminal ID of the image capturing terminal 20 is not set in the permission ID filter 16 of the image capturing control server 11 as a permission ID, or in other words, if the controller 32 receives the setting failure information (No in S1105), the controller 32 instructs the transmitter 17*b* to transmit use refusal information to the image capturing terminal 20. Instructed, the transmitter 31*b* transmits use refusal information to the image capturing terminal via the WAN 50 (Step S1107), and ends the processing.

In Step S1105, when the permission ID transmitted to the image capturing control server 11 is not set in the permission ID filter 16, the controller 32 receives setting failure information via the receiver 17*a* and thereby determines that the permission ID transmitted to the image capturing control server 11 is not set in the permission ID filter 16. However, the present disclosure is not limited to such processing described above.

For example, if the camera system 10 is being used by any other image capturing terminal 20 at the time of the reception of the permission ID, the permission ID setter 13 may temporarily store the received permission ID in the memory 111*b*. Then, the permission ID setter 13 may instruct the transmitter 17*b* to transmit in-use information to the authentication server 30. In-use information indicates that the camera system 10 is being used by an image capturing terminal other than the image capturing terminal 20, or in other words, information indicating waiting for a turn. Instructed, the transmitter 17*b* may transmit in-use information to the authentication server 30 via the WAN 50.

When the other image capturing terminal finishes using the camera system 10, making the camera system 10 available to the image capturing terminal 20, the permission ID setter 13 may instruct the transmitter 17*b* to transmit "available" information to the authentication server 30. "Available" information indicates that the camera system 10 has become available to the image capturing terminal 20. Instructed, the transmitter 17*b* may transmit "available" information to the authentication server 30 via the WAN 50.

Then, the permission ID setter 13 may set the temporarily-stored permission ID in the permission ID filter 16 and instruct the transmitter 17*b* to transmit setting completion information to the authentication server 30. This way, even if the camera system 10 is being used by an image capturing terminal other than the image capturing terminal 20 identified by the permission ID received by the permission ID setter 13, the camera system 10 becomes available to the image capturing terminal 20 once the other image capturing terminal finishes.

Figure 8:
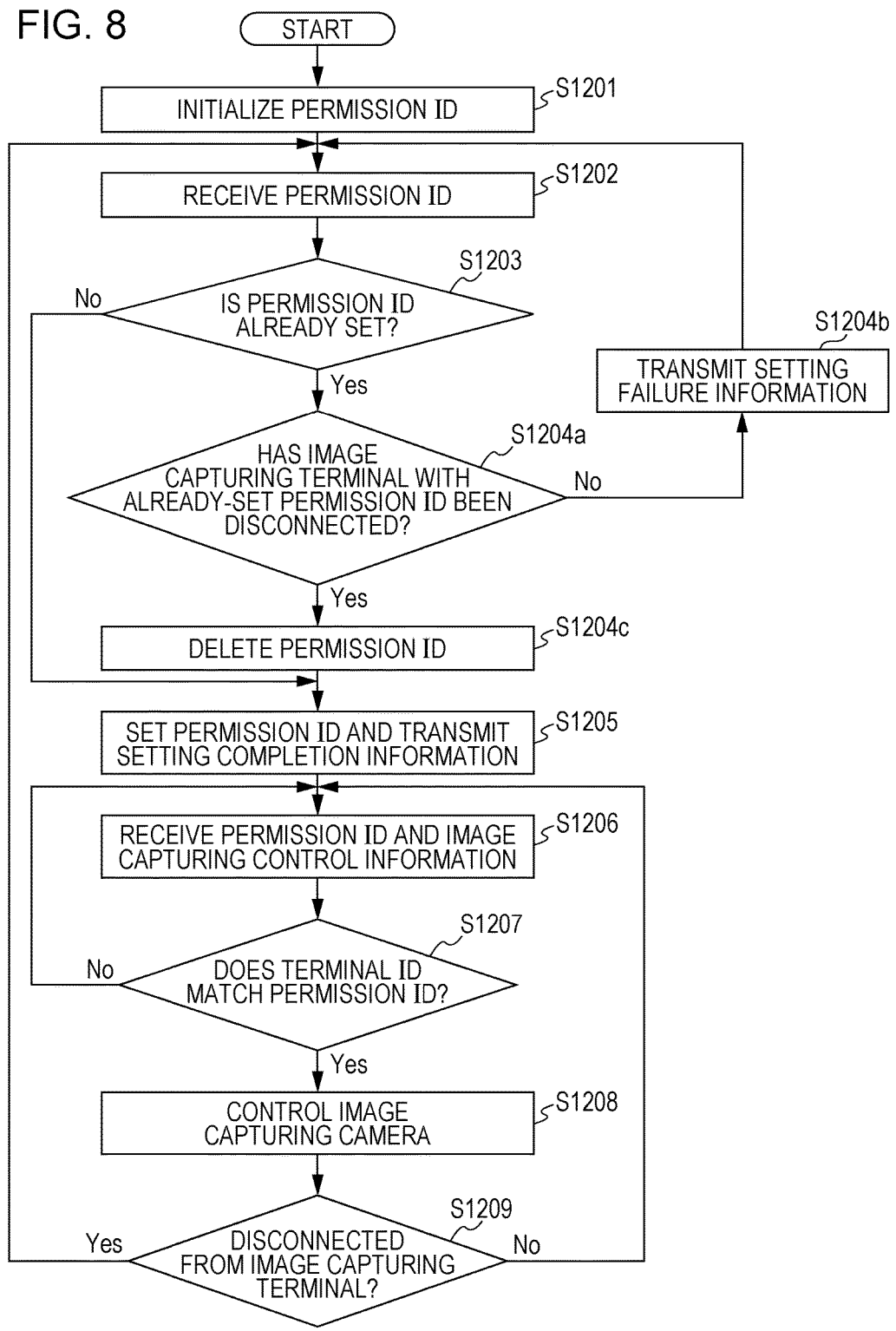
FIG. 8 is a flowchart illustrating an example of a procedure by which a camera system depicted in FIG. 5 operates.

Next, using a flowchart in FIG. 8, a description is given of how the camera system 10 operates. FIG. 8 is a flowchart illustrating an example of a procedure by which the camera system 10 depicted in FIG. 5 operates.

First, so as not to be controlled by any of the image capturing terminals 20, the camera system 10 initializes a permission ID, or in other words, deletes the permission ID set in the permission ID filter 16 (Step S1201). More specifically, the permission ID setter 13 deletes the permission ID registered on the permission ID filter 16 of the camera communicator 14.

Next, the receiver 17*a* newly receives a permission ID from the authentication server 30, and outputs the newly-received permission ID to the permission ID setter 13 (Step S1202). In this example, the permission ID newly received is the terminal ID of the image capturing terminal 20. The receiver 17*a* may receive only one permission ID, but the present disclosure is not limited to this. For instance, if the authentication server 30 is configured to transmit the same permission ID more than once, the receiver 17*a* receives the same permission ID more than once. The purpose of this is to prevent the receiver 17*a* from missing the permission ID due to a failure in the communication line of the WAN 50 between the authentication server 30 and the image capturing control server 11. In this case, the receiver 17*a* may measure time with a timer (not shown) after receiving a permission ID, and if no additional permission ID is received until the measured time reaches a predetermined time period, output the permission ID to the permission ID setter 13 as a new permission ID.

Alternatively, the permission ID setter 13 may perform the above processing. In this case, the permission ID setter 13 may measure time using a timer (not shown) after receiving the permission ID via the receiver 17*a*, and if no additional permission ID is received until the measured time reaches a predetermined time period, perform the following processing using the permission ID as a new permission ID.

When the receiver 17*a* receives a new permission ID, the permission ID setter 13 checks whether a different image capturing terminal 20 is currently given the permission to control the image capturing camera 12, or in other words, whether a permission ID different from the newly received permission ID is already set in the permission ID filter 16 (Step S1203). If no permission ID is set (No in Step S1203), the permission ID setter 13 determines that the image capturing terminal 20 identified by the new permission ID can use the camera system 10, and proceeds to Step S1205.

If a permission ID is already set in the permission ID filter 16 (Yes in Step S1203), the permission ID setter 13 determines whether the image capturing terminal 20 identified by the new permission ID can use the camera system 10, or in other words, whether the image capturing terminal 20 can have an image captured by the image capturing camera 12. Specifically, the permission ID setter 13 determines whether the LAN connection is terminated between the image capturing control server 11 and the image capturing terminal identified by the permission ID already set in the permission ID filter 16 (Step S1204*a*).

When determining that the LAN connection is yet to be terminated between the image capturing control server 11 and the image capturing terminal identified by the permission ID already set in the permission ID filter 16 (No in Step S1204*a*), the permission ID setter 13 determines that the image capturing terminal 20 cannot use the image capturing camera 12 to have an image captured because the image capturing terminal identified by the already-set permission ID is currently using the camera system 10 to have an image captured.

In this case, the permission ID setter 13 instructs the transmitter 17*b* to transmit setting failure information to the authentication server 30. Setting failure information indicates that the permission ID setter 13 failed in setting the newly received permission ID. Instructed, the transmitter 17*b* transmits setting failure information to the authentication server 30 via the WAN 50. The processing then proceeds back to Step S1202 and wait to receive a new permission ID.

On the other hand, when determining that the LAN connection has been terminated between the image capturing control server 11 and the image capturing terminal identified by the permission ID already set in the permission ID filter 16 (Yes in Step S1204*a*), the permission ID setter 13 determines that the image capturing terminal 20 can use the image capturing camera 12 to have an image captured because the image capturing terminal identified by the already-set permission ID has finished using the camera system 10 to have an image captured. The processing then proceeds to Step S1204*c*.

The permission ID setter 13 deletes the permission ID that has been set before receiving the new permission ID (Step S1204*c*).

Next, in order to output image capturing control information from the image capturing terminal 20 identified by the newly received permission ID to the camera controller 15, the permission ID setter 13 sets the newly received permission ID in the permission ID filter 16 of the camera communicator 14 and instructs the transmitter 17*b* to transmit setting completion information to the authentication server 30. Setting completion information indicates that the permission ID has been set. Instructed, the transmitter 17*b* transmits setting completion information to the authentication server 30 via the WAN 50 (Step S1205).

Once the processing of Step S1205 is executed, only the image capturing control information transmitted from the image capturing terminal identified by the same terminal ID as the permission ID newly received in Step S1202 (the image capturing terminal 20 in this case) is outputted from the camera communicator 14 to the camera controller 15.

Next, the camera communicator 14 receives a terminal ID and image capturing control information via the LAN 40 (Step S1206). At the point when the camera communicator 14 receives the terminal ID and the image capturing control information via the LAN 40, it is yet to be identified whether the image capturing terminal that has transmitted the terminal ID and the image capturing control information via the LAN 40 is the image capturing terminal 20.

As described earlier, in the following description, an image capturing terminal 20 identified by a terminal ID that has been received from the authentication server 30 via the WAN 50 as a permission ID is referred to as a first capturing terminal, and an image capturing terminal that transmits its terminal ID and image capturing control information via the LAN 40 is referred to as a second image capturing terminal. The terminal ID of the image capturing terminal 20 received as a permission ID has been set in the permission ID filter 16 in Step S1205.

The camera communicator 14, or specifically the permission ID filter 16, determines whether the terminal ID received via the LAN 40 agrees with the permission ID set in the permission ID filter 16 (Step S1207). When the received terminal does not agree with the permission ID (No in Step S1207), the camera communicator 14 determines that the second image capturing terminal is not the first image capturing terminal, or in other words, not the image capturing terminal 20, and the processing proceeds to Step S1206.

For instance, if the camera communicator 14 receives a terminal ID and image capturing control information from an image capturing terminal identified by the terminal ID different from the permission ID, the received terminal ID is different from the registered permission ID (No in Step S1207). Thus, the image capturing information is not outputted to the camera controller 15, and the processing proceeds to Step S1206 to wait to receive new image capturing control information.

In other words, the permission ID filter 16 prevents image capturing control information received along with a terminal ID not agreeing with the permission ID from being outputted to the camera controller 15. In the present embodiment, the permission ID and the terminal ID are both a MAC address. Thus, if the camera communicator 14 is formed by a wireless LAN adapter, the permission ID filter 16 can be implemented by a hardware function of the wireless LAN adapter. Configuring the camera communicator 14 using a wireless LAN adapter enables faster filtering than filtering achieved by software.

On the other hand, if the received terminal ID agrees with the permission ID (Yes in Step S1207), the camera communicator 14 determines that the second image capturing terminal is the first image capturing terminal, or in other words, is the image capturing terminal 20. In this case, the image capturing control information received along with the terminal ID is outputted to the camera controller 15 through the permission ID filter 16, and the camera controller 15 performs image capturing control of the image capturing camera 12 in accordance with the image capturing control information from the camera communicator 14 (Step S1208).

For instance, if the camera communicator 14 receives a terminal ID and image capturing control information from an image capturing terminal 20 having a terminal ID agreeing with the permission ID, the received terminal ID agrees with the permission ID set in the permission ID filter 16 (Yes in Step S1207). Thus, the camera communicator 14 outputs the image capturing control information to the camera controller 15, and the camera controller 15 controls the image capturing in the image capturing spot by the image capturing camera 12 in accordance with the received image capturing control information.

Next, the camera communicator 14 determines whether image capturing control by the image capturing terminal 20 is finished, and network connection with the image capturing terminal 20 has been terminated (Step S1209). If the camera communicator 14 determines that the network connection with the image capturing terminal 20 has not been terminated (No in Step S1209), the processing proceeds back to Step S1206. If the camera communicator 14 determines that the network connection with the image capturing terminal 20 has been terminated (Yes in Step S1209), the camera system 10 ends the image capturing control for this image capturing terminal 20, proceeds back to Step S1202, and waits to receive a permission ID different from the terminal ID of the image capturing terminal 20 from the authentication server 30.

If not accessed by the image capturing terminal 20 for a certain period of time, the camera system 10 may force the network connection to be terminated.

FIG. 9 is a flowchart illustrating another example of the procedure by which the camera system 10 depicted in FIG. 5 operates.

In FIG. 9, the steps denoted by the same numbers as those in FIG. 8 are the same or equivalent steps as those in FIG. 8, and are therefore not described in detail below. In FIG. 9, Step S1203 in FIG. 8 is replaced by Step S1203a, and when the determination result of Step S1209 is Yes, the processing proceeds back to Step S1202 through Step S1210.

When the network connection with the image capturing terminal 20 has been terminated (Yes in Step S1209), in Step S1210 the permission ID setter 13 deletes the permission ID set in the permission ID filter 16 and proceeds back to Step S1202.

In Step S1203a, the permission ID setter 13 checks whether a permission ID is already set in the permission ID filter 16. No permission ID is set in the permission ID filter 16 when a permission ID is received for the first time in Step S1202 after the permission ID set in the permission ID filter 16 is initialized in Step S1201 or deleted in Step S1210.

If no permission ID is set in the permission ID filter 16 (No in Step S1203a), the permission ID setter 13 determines that the image capturing terminal 20 identified by the new permission ID can use the camera system 10, and proceeds to Step S1205.

If, on the other hand, a permission ID is already set in the permission ID filter 16 (Yes in Step S1203a), the permission ID setter 13 determines that the image capturing terminal 20 cannot use the image capturing camera 12 to have an image captured because an image capturing terminal identified by the already-set permission ID is currently using the camera system 10 to have an image captured. The permission ID setter 13 then proceeds to Step S1204b.

With such a configuration, Step S1204a in FIG. 8 can be omitted.

(1-4. Advantageous Effects)

According to the present embodiment, only the terminal ID of a single image capturing terminal 20 is set, as setting information, in the permission ID filter 16 in the camera communicator 14 of the image capturing control server 11 of the camera system 10. Thus, only when a terminal ID received by the camera communicator 14 via the LAN 40 agrees with the terminal ID of the image capturing terminal 20 set in the permission ID filter 16, image capturing control information received along with the terminal ID via the LAN 40 is outputted to the camera controller 15.

To put it the other way around, even if an image capturing terminal not permitted to use the camera system 10, or in other words, an image capturing terminal different from the image capturing terminal 20 transmits image capturing control information along with its terminal ID to the image capturing control server 11 via the LAN 40, the camera communicator 14 does not output the received image capturing control information to the camera controller 15 because the received terminal ID does not agree with the terminal ID of the image capturing terminal 20 set in the permission ID filter 16.

Thus, only the image capturing terminal 20 can use the camera system 10 to have an image captured by the image capturing camera 12, and thus load on the LAN 40 lessens. As a result, when the image capturing terminal 20 has an image captured by controlling the image capturing camera 12 installed in an image capturing spot, the image capturing camera 12 can stably perform image capturing operation with respect to the image capturing camera 12.

2. Modifications

The embodiment of the image capturing control system according to the present disclosure has been described above. However, the present disclosure is of course not limited to the image capturing control system of the embodiment described above, and the image capturing control system illustrated above as an example can be modified as follows.

(1) In the above embodiment, the image capturing terminal 20 and the authentication server 30 as well as the camera system 10 and the authentication server 30 communicate with each other via the Internet, but they may be connected and communicate over a local area network like the image capturing terminal 20 and the camera system 10.

(2) The camera communicator 14 in the above embodiment may be formed by a wireless LAN access point device.

(3) The receiver 31*a*, the transmitter 31*b*, the controller 32, and the permitted terminal ID storage unit 33 of the authentication server 30 in the above embodiment may be included within the camera system 10 (or the image capturing control server 11).

(4) Although the image capturing terminal 20 and the camera system 10 are connected by a wireless LAN in the above embodiment, other communication methods including a wired LAN may be used. For example, the image capturing terminal 20 and the camera system 10 may be connected using Universal Serial Bus (USB) or Bluetooth (registered trademark).

(5) Control programs formed by program code written in machine language or a higher-level language for causing the processors of the image capturing terminal 20, the authentication server 30, and the camera system 10 as well as various circuits connected to these processors to execute the processing for the image capturing terminal 20, the authentication server 30, and the camera system 10 may be stored in a recording medium or distributed via various types of communication channels or the like.

Examples of such a recording medium include an IC card, a hard disk, an optical disk, a flexible disk, a ROM, and a flash memory. The distributed control programs become usable when stored in memory or the like accessible to the processors, and the processors can implement the functions described in the above embodiment by executing the control programs. Other than directly executing the control programs, the processor may execute them after compiling them or cause an interpreter to execute them.

(6) The functional constituents described in the embodiment above (such as the image capturing terminal 20, the authentication server 30, and the camera system 10) may be implemented as circuits that execute the functions or may be implemented when one or more processors execute programs.

Note that the above-described functional constituents are typically implemented as large scale integration (LSI) circuits. Each of the functional constituents may be integrated on one chip, or some or all of the functional constituents may be packaged into one chip. Depending on the level of integration, the LSI circuit may be called an IC, a system LSI, a super LSI, or an ultra LSI. The circuit integration method is not limited to LSI, and may be implemented with a dedicated circuit or a general-purpose processor. A field programmable gate array (FPGA), which is programmable after manufacturing of LSI, or a reconfigurable processor, which allows reconfiguration of connections or settings of circuit cells within LSI, may be used. Further, should any new integrated circuit technology replace LSI due to development of semiconductor technology or other derived technology, the functional constituents may of course be integrated using that technology.

(7) The embodiment and modifications described above may be combined partly.

When capturing an image of a subject in an image capturing spot using an image capturing camera installed facing toward the image capturing spot, the image capturing control method according to the present disclosure can establish one-to-one communication network between a camera system and a user permitted to have an image captured and acquire data on the image captured. Thus, the image capturing control method can be suitably applied to a system for taking commemorative pictures at places such as a theme park, an amusement facility, and a sightseeing spot.

What is claimed is:

1. An image capturing control method for an image capturing control system including an authentication server and an image capturing control server, the method comprising:

the authentication server receiving first terminal identification information identifying a first image capturing terminal from the first image capturing terminal via a wide area network (WAN);

the authentication server determining whether the first image capturing terminal identified by the received first terminal identification information is an image capturing terminal permitted to have an image captured by an image capturing camera via a local area network (LAN);

when determining that the first image capturing terminal is an image capturing terminal permitted to have an image captured by the image capturing camera, the authentication server transmitting permitted terminal identification information to the image capturing control server via the WAN, the permitted terminal identification information being the first terminal identification information;

the image capturing control server receiving the permitted terminal identification information from the authentication server via the WAN;

the image capturing control server setting the permitted terminal identification information as setting information for a communicator that communicates via the LAN;

when the communicator receives, from a second image capturing terminal via the LAN, second terminal identification information identifying the second image capturing terminal and image capturing control information for controlling the image capturing camera, the image capturing control server determining whether the second image capturing terminal is the first image capturing terminal by determining whether the received second terminal identification information agrees with the first terminal identification information set as the permitted terminal identification information; and when determining that the second image capturing terminal is the first image capturing terminal, the image capturing control server controlling the image capturing camera in accordance with the image capturing control information received along with the second terminal identification information.

2. The image capturing control method according to claim 1, wherein the setting includes setting, in the communicator, only the first terminal identification information received as the permitted terminal identification information.

3. The image capturing control method according to claim 1, wherein the setting includes determining whether the authentication server that has transmitted the permitted terminal identification information is a predesignated authentication server, and when determining that the authentication server is a predesignated authentication server, setting the received permitted terminal identification information in the communicator.

4. The image capturing control method according to claim 1, further comprising:

after receiving the permitted terminal identification information from the authentication server, the image capturing control server determining whether additional permitted terminal identification information is received from the authentication server within a predetermined period of time, and the setting the permitted terminal identification information in the communicator is performed when it is determined that no additional permitted terminal identification information is received from the authentication server within the predetermined period of time.

5. The image capturing control method according to claim 1, wherein the communicator includes a filter unit that permits only a set MAC address to be communicated therethrough, the first terminal identification information indicates a MAC address of the first image capturing terminal, the second terminal identification information indicates a MAC address of the second image capturing terminal, and the determining includes determining that the second image capturing terminal is the first image capturing terminal when the MAC address of the second image capturing terminal agrees with the MAC address of the first image capturing terminal.

6. The image capturing control method according to claim 5, wherein the filter unit is formed using a circuit.

7. An image capturing control system comprising:

an authentication server; and an image capturing control server, wherein the authentication server includes a receiver that receives first terminal identification information identifying a first image capturing terminal from the first image capturing terminal via a wide area network (WAN), a controller that determines whether the first image capturing terminal identified by the received first terminal identification information is an image capturing terminal permitted to have an image captured by an image capturing camera via a local area network (LAN), and a transmitter that, when the controller determines that the first image capturing terminal is an image capturing terminal permitted to have an image captured by the image capturing camera, transmits permitted terminal identification to the image capturing control server via the WAN, the permitted terminal identification information being the first terminal identification information and the image capturing control server includes a first communicator that receives the permitted terminal identification information from the authentication server via the WAN;

a second communicator that communicates via the LAN, a setter that sets the received permitted terminal identification information as setting information for the second communicator, and a camera controller that controls an image capturing camera, when receiving, from a second image capturing terminal via the LAN, second terminal identification information identifying the second image capturing terminal and image capturing control information for controlling the image capturing camera, the second communicator determines whether the second image capturing terminal is the first image capturing terminal by determining whether the received second terminal identification information agrees with the first terminal identification information set as the permitted terminal identification information, when determining that the second image capturing terminal is the first image capturing terminal, the second communicator outputs the image capturing control information received via the LAN along with the second terminal identification information to the camera controller, and the camera controller controls the image capturing camera in accordance with the image capturing control information received.

8. An image capturing control server comprising:

a first communicator that receives permitted terminal identification information from an authentication server via a wide area network (WAN);

a second communicator that communicates via a local area network (LAN);

a setter that sets the received permitted terminal identification information as setting information for the second communicator; and a camera controller that controls an image capturing camera, wherein the permitted terminal identification information is first terminal identification information identifying a first image capturing terminal permitted by the authentication server to have an image captured by the image capturing camera via the LAN, when receiving, from a second image capturing terminal via the LAN, second terminal identification information identifying the second image capturing terminal and image capturing control information for controlling the image capturing camera, the second communicator determines whether the second image capturing terminal is the first image capturing terminal by determining whether the received second terminal identification information agrees with the first terminal identification information set as the permitted terminal identification information, when determining that the second image capturing terminal is the first image capturing terminal, the second communicator outputs the image capturing control information received via the LAN along with the second terminal identification information to the camera controller, and the camera controller controls the image capturing camera in accordance with the image capturing control information received.

* * * * *